US012769901B2

(12) United States Patent
Casey et al.

(10) Patent No.: US 12,769,901 B2
(45) Date of Patent: Oct. 20, 2026

(54) SIMULATION OF MODIFICATIONS TO AN ELECTRICAL GRID

(71) Applicant: X Development LLC, Mountain View, CA (US)

(72) Inventors: Leo Francis Casey, San Francisco, CA (US); Page Furey Crahan, San Francisco, CA (US); Amanda McNary, Redwood City, CA (US); Gaurav Desai, San Jose, CA (US); Peter Evans, Los Altos Hills, CA (US); Raymond Daly, Palo Alto, CA (US); Xinyue Li, San Mateo, CA (US); Eugene Kim, Los Angeles, CA (US); Phillip Ellsworth Stahlfield, Mountain View, CA (US); David Charles Chou, San Jose, CA (US); Nicole Limtiaco, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 1082 days.

(21) Appl. No.: 17/725,964

(22) Filed: Apr. 21, 2022

(65) Prior Publication Data

US 2022/0343230 A1 Oct. 27, 2022

Related U.S. Application Data

(60) Provisional application No. 63/196,823, filed on Jun. 4, 2021, provisional application No. 63/177,502, filed on Apr. 21, 2021.

(51) Int. Cl.

| | |
|---|---|
| ***G06F 30/20*** | (2020.01) |
| ***G06Q 50/06*** | (2012.01) |
| *G06F 113/04* | (2020.01) |

(52) U.S. Cl.
CPC ............ *G06F 30/20* (2020.01); *G06Q 50/06* (2013.01); *G06F 2113/04* (2020.01)

(58) Field of Classification Search
CPC ...... G06F 30/20; G06F 2113/04; G06Q 50/06
(Continued)

(56) References Cited

U.S. PATENT DOCUMENTS

| | | | |
|---|---|---|---|
| 7,739,138 | B2 | 6/2010 | Chauhan et al. |
| 7,860,702 | B1 | 12/2010 | Evans et al. |
| 8,229,722 | B2 | 7/2012 | Naste |

(Continued)

FOREIGN PATENT DOCUMENTS

| | | | |
|---|---|---|---|
| CN | 102508989 | A | 6/2012 |
| JP | 2005025377 | A | 1/2005 |

(Continued)

OTHER PUBLICATIONS

International Preliminary Report on Patentability in International Appln. No. PCT/US2022/025546, dated Nov. 2, 2023, 10 pages.

(Continued)

*Primary Examiner* — Brian S Cook
(74) *Attorney, Agent, or Firm* — Fish & Richardson P.C.

(57) ABSTRACT

A method includes providing, for presentation by a display, a user interface including graphics depicting one or more fields for receiving input for simulations of electrical grid scenarios. The method includes receiving input for a scenario including a proposed modification to the electrical grid and performing a simulation by modeling the input in a virtual model of an electrical grid. The method includes modifying the user interface to include graphics depicting: visualizations of results of the simulation for the scenario; and a menu of options for modifying the input. The method includes receiving a selection from the menu of options for modifying the input; performing a modified simulation by modeling the modified input in the virtual model of the (Continued)

electrical grid; and modifying the user interface to include graphics depicting visualizations of the results of the simulation compared to the results of the modified simulation.

20 Claims, 20 Drawing Sheets

(58) Field of Classification Search
USPC .......................................................... 703/13
See application file for complete search history.

(56) References Cited

U.S. PATENT DOCUMENTS

| | | | |
|---|---|---|---|
| 8,473,263 | B2 | 6/2013 | Tolone |
| 9,740,227 | B2 | 8/2017 | Forbes |
| 9,846,752 | B2 | 12/2017 | Naste |
| 10,090,704 | B2 | 10/2018 | Inuzuka et al. |
| 10,444,806 | B2 | 10/2019 | Brockman et al. |
| 10,460,264 | B2 | 10/2019 | Sun et al. |
| 10,852,716 | B2 | 12/2020 | Sayyarrodsari et al. |
| 2008/0109205 | A1 | 5/2008 | Nasle |
| 2010/0094573 | A1 | 4/2010 | Yang et al. |
| 2011/0106321 | A1 | 5/2011 | Cherian et al. |
| 2012/0109719 | A1 | 5/2012 | Parmar et al. |
| 2013/0317785 | A1* | 11/2013 | Chainer ............... H05K 7/2079 703/1 |
| 2015/0006128 | A1 | 1/2015 | Enenkel et al. |
| 2016/0139212 | A1 | 5/2016 | Lin et al. |
| 2018/0129768 | A1* | 5/2018 | Enenkel ............ H02J 13/00017 |
| 2018/0373824 | A1 | 12/2018 | Meagher et al. |
| 2020/0220351 | A1 | 7/2020 | Meagher et al. |

FOREIGN PATENT DOCUMENTS

| | | | |
|---|---|---|---|
| JP | 2015-226391 | A | 12/2015 |
| JP | 2016-92896 | A | 5/2016 |
| JP | 2018-033282 | A | 3/2018 |
| JP | 2019-162004 | A | 9/2019 |
| JP | 2019-201505 | A | 11/2019 |
| WO | WO 2020/230276 | A1 | 11/2020 |

OTHER PUBLICATIONS

International Search Report and Written Opinion in International Appln. No. PCT/US2022/025546, dated Aug. 8, 2022, 19 pages.

Vysocky et al., "New User-Friendly Software Application to Simulate and Visualize The Distribution System Operation," 2019 20th International Scientific Conference on Electrical Power Engineering, May 2019, pp. 1-6.

Decision to Grant Patent in Japanese Appln. No. 2023-565310, mailed on Mar. 11, 2025, 5 pages (with English translation).

Office Action in Japanese Appln. No. 2023-565310, dated Dec. 2, 2024, 6 pages (with English translation).

Office Action in European Appln. No. 22722929.1, mailed on Feb. 17, 2026, 11 pages.

Notice of Allowance in Japanese Appln. No. 2025-078937, mailed on Apr. 20, 2026, 5 pages (with English translation).

Office Action in Chinese Appln. No. 202280044496.5, mailed on Apr. 13, 2026, 58 pages (with English translation).

Office Action in Korean Appln. No. 10-2023-7039572, mailed on Mar. 11, 2026, 17 pages (with English translation).

* cited by examiner

1200

1400

SIMULATION OF MODIFICATIONS TO AN ELECTRICAL GRID

CROSS-REFERENCE TO RELATED APPLICATION

This application claims the benefit of U.S. Provisional Patent Application No. 63/196,823, filed Jun. 4, 2021, and U.S. Provisional Patent Application No. 63/177,502, filed Apr. 21, 2021, the contents of which are incorporated by reference herein.

TECHNICAL FIELD

The present specification relates to electrical power grids, and specifically to performing operational modeling and simulation of an electrical grid system.

BACKGROUND

Electrical power grids transmit electrical power to loads such as residential and commercial buildings. Electrical power grids are complex and require a vast array of commercial, regulatory, legislative, and other stakeholders to evaluate and make investment and operating decisions. To aid in making decisions regarding electrical grid modifications, virtual models of an electrical grid can be used to simulate operations under various conditions.

Historically, decision makers have used different tools or methods to evaluate their electric grid investment decisions. This could range from hiring a consulting firm to perform the evaluation, to establishing an in-house team of experts, and to leveraging any available technology. Given the complexity of modeling and evaluation, and the established decision making criteria of capital expenditure, rate of return, risk and reliability, many utilities use three to four software programs, with awkward or non-existent interfaces between them. In many cases, virtual electric grid models are bespoke and re-implemented across utilities, leading to fragmentation between utilities.

Current processes not only model or evaluate using siloed tools, but the core modeling technology in these siloed tools is limited. Simplifications are made with factors like electrical variables; intra-day, or intra-hour, forecasting of load or generation of price; and even the number of nodes considered in a model. Moreover, these tools use different underlying grid models that magnify the divergence in the results they produce.

SUMMARY

In general, the present disclosure relates to a system for obtaining input for simulations of electrical power grid operations and presenting results of the simulations. Virtual electrical grid models are used to evaluate and predict operations of an electrical grid. The present disclosure provides systems and methods for receiving input for an electrical grid scenario, performing a simulation of the electrical grid scenario, and displaying visualizations of the results of the simulation. The system can receive the input and display the results through user interfaces presented on a display of a computer system. The simulation system can provide results related to environmental, reliability, regulatory, and financial impacts of a proposed electrical grid modification.

In some implementations, the simulation system can provide a user interface for receiving input for analysis of an electric grid project. The user interface can include design tools that can be used to configure proposed modifications to electric grid configurations. Modified electric grid configurations can include simulated physical changes to the electric grid, such as adding and removing power generation sources, and simulated non-physical changes, such as hypothetical load growth scenarios.

The simulation system can receive, through the user interface, data indicating a user selection of baseline data input sources, data indicating a geographic area for the analysis, and data indicating a user selection of a time horizon for the project. The simulation system can also receive, through the user interface, user input for a scenario for the analysis. The scenario can include one or more proposed changes to the electric grid that are to be simulated. For example, a first scenario can include an addition of a power generation source to the electric grid. The system can receive a user selection of a location and type of the proposed added power generation source, and ratings of the proposed added power generation source. The system can also receive user input indicating simulation assumptions, e.g., an assumed annual load growth of fifteen percent.

After performing the requested simulation, the simulation system can modify the user interface to include visualizations of simulation results for the input scenario. In some cases, the simulation system can present a second user interface showing the visualizations. Visualizations can include, for example, tables, charts, graphs, and maps. The user interface can also enable a user to adjust evaluation parameters and assumptions after viewing the simulation results. For example, the user interface can include various menus for requesting additional simulations and modified simulations.

In some examples, the user interface can include a menu of options for modifying the input scenario. The system can receive, through the user interface, modified input. For example, the system can receive input modifying the power rating of the proposed added power source in the first scenario. Based on the modified input, the simulation system can perform an updated simulation and display updated results for the first scenario.

In some examples, the user interface can include a selectable option to input an additional scenario. The system can receive, through the user interface, a selection of the selectable option to input an additional scenario. In response to receiving the selection to input the additional scenario, the system can modifying the user interface to include graphics depicting the one or more fields for receiving input for simulations of electrical grid scenarios. The system can then receive, through the user interface, input for a second scenario. For example, the second scenario can include an upgrade of a currently existing power generation source.

The results displayed through the user interface can include a comparison view showing evaluated parameters of each of multiple scenarios compared to each other and compared to a baseline scenario. For example, the user interface can show trend lines of power quality over time for each of the baseline data input, the first scenario, and the second scenario, shown on the same graph. The user interface can also show a map view indicating characteristics of the electric grid as simulated based on each of the scenarios. Results of the simulation provided through the user interface can be time varying. For example, the results can be displayed for a user-selected point in time, or time duration, that falls within the time horizon for the project. In some examples, results can be aggregated and/or averaged over simulated time durations.

In general, innovative aspects of the subject matter described in this specification can be embodied in a computer-implemented method comprising: providing, for presentation by a display, a user interface including graphics depicting one or more fields for receiving input for simulations of electrical grid scenarios; receiving, through the user interface, input for a scenario, the input including: a geographic location for the scenario; a time scale for the scenario; and a proposed modification to an electrical grid; performing a simulation for the scenario by modeling the input in a virtual model of an electrical grid; modifying the user interface to include graphics depicting: one or more visualizations of results of the simulation; and a menu of options for modifying the input; receiving, through the user interface, a selection from the menu of options for modifying the input; performing a modified simulation by modeling the modified input in the virtual model of the electrical grid; and modifying the user interface to include graphics depicting one or more visualizations of the results of the simulation compared to results of the modified simulation.

In general, innovative aspects of the subject matter described in this specification can be embodied in a computer-implemented method comprising: providing, for presentation by a display, a first user interface for receiving input for simulations of electrical grid scenarios; receiving, through the first user interface, input for a scenario, the input including: a geographic location for the scenario; a time scale for the scenario; and a proposed modification to an electrical grid; performing a simulation for the scenario by modeling the input in a virtual model of an electrical grid; providing, for presentation by the display, a second user interface, the second user interface including: one or more visualizations of results of the simulation; and a menu of options for modifying the input; receiving, through the second user interface, a selection from the menu of options for modifying the input; performing a modified simulation by modeling the modified input in the virtual model of the electrical grid; and providing, for presentation by the display, an updated second user interface, the updated second user interface including one or more visualizations of the results of the simulation compared to the results of the modified simulation.

These and other embodiments can include the following features, alone or in any combination. In some implementations, the display includes a first display. The method include receiving, through a user interface presented on a second display, input for a second scenario, the input including a second proposed modification to the electrical grid; performing a second simulation by modeling the input for the second scenario in the virtual model of the electrical grid; and providing, for presentation by the first display, a second user interface including one or more visualizations of the results of the simulation compared to the results of the second simulation.

In some implementations, the method includes receiving, through a second user interface presented on a second display, input for a second scenario, the input including a second proposed modification to the electrical grid; performing a second simulation by modeling the input for the second scenario in the virtual model of the electrical grid; and modifying the user interface to include graphics depicting one or more visualizations of the results of the simulation compared to the results of the second simulation.

In some implementations, the scenario includes a particular grid configuration, and performing the simulation for the scenario includes: adjusting the virtual model of the electrical grid to represent the particular grid configuration; and determining characteristics of the adjusted virtual model of the electrical grid under various simulated conditions.

In some implementations, the particular grid configuration includes at least one of an added or removed power source, an upgraded asset, or an added or removed connection.

In some implementations, the various simulated conditions include at least one of various environmental conditions or various load conditions.

In some implementations, the scenario includes a particular condition, and performing the simulation for the scenario includes: adjusting the virtual model of the electrical grid to represent the particular condition; and determining characteristics of the adjusted virtual model of the electrical grid in various simulated grid configurations.

In some implementations, the particular condition includes at least one of a particular environmental condition or a particular load condition.

In some implementations, the various simulated grid configurations include at least one of added and removed power sources, upgraded assets, or added or removed connections.

In some implementations, performing the simulation for the scenario by modeling the input in the virtual model of the electrical grid includes performing a baseline simulation for the geographic location and the time scale included in the input, and the results of the simulation include effects of the proposed modification on results of the baseline simulation.

In some implementations, the modified input includes a second proposed modification to the electrical grid that is different from the proposed modification, and the results of the modified simulation include effects of the second proposed modification on results of the baseline simulation.

In some implementations, the method includes performing a simulation for a baseline scenario for the geographic location and the time scale included in the input. The user interface includes graphics depicting one or more visualizations of the results of the simulation for the scenario compared to the results of the simulation for the baseline scenario.

In some implementations, the method includes evaluating the proposed modification using a set of rules; and providing, for presentation by the display, a notification that the proposed modification violates at least one rule of the set of rules.

In some implementations, each rule included in the set of rules includes at least one of a law, a regulation, an equipment limitation, an operational limitation, or an industrial standard.

In some implementations, the virtual model of the electrical grid includes a virtual model of real-world electrical grid assets.

In some implementations, the geographic location includes a location of a selected feeder of a real-world electrical grid.

In some implementations, the method includes, in response to receiving the input for the scenario, accessing the virtual model of the electrical grid, the virtual model including multiple different model configurations; and selecting, based on the input for the scenario, (i) a simulation mode including a resolution and scale of the simulation and (ii) one of the multiple different model configurations. Performing the simulation for the scenario includes executing the simulation in the selected simulation mode using the selected model configuration.

In general, other innovative aspects of the subject matter described in this specification can be embodied in a computer-implemented method including: providing, for presentation by a display, a user interface including graphics depicting one or more fields for receiving input for simulations of electrical grid scenarios; receiving, through the user interface, first input for a first scenario; in response to receiving the first input, performing a first simulation for the first scenario by modeling the first input in a virtual model of an electrical grid; modifying the user interface to include graphics depicting: one or more visualizations of results of the first simulation for the first scenario; and a selectable option to input an additional scenario; in response to receiving a selection of the selectable option to input an additional scenario, modifying the user interface to include graphics depicting the one or more fields for receiving input for simulations of electrical grid scenarios; receiving, through the user interface, second input for a second scenario; in response to receiving the second input, performing a second simulation for the second scenario by modeling the second input in the virtual model of the electrical grid; and modifying the user interface to include graphics depicting one or more visualizations of the results of the first simulation compared to results of the second simulation.

In general, other innovative aspects of the subject matter described in this specification can be embodied in a computer-implemented method including: providing, for presentation by a display, a first user interface for receiving input for simulations of electrical grid scenarios; receiving, through the first user interface, first input for a first scenario; in response to receiving the first input, performing a first simulation for the first scenario by modeling the first input in a virtual model of an electrical grid; providing, for presentation by the display, a second user interface, the second user interface including: one or more visualizations of results of the first simulation for the first scenario; and a selectable option to input an additional scenario; in response to receiving a selection of the selectable option to input an additional scenario, providing, for presentation by the display, the first user interface; receiving, through the first user interface, second input for a second scenario; in response to receiving the second input, performing a second simulation for the second scenario by modeling the second input in the virtual model of the electrical grid; and providing, for presentation by the display, an updated second user interface, the updated second user interface including one or more visualizations of the results of the first simulation compared to the results of the second simulation.

These and other embodiments can include the following features, alone or in any combination. In some implementations, the display includes a first display. The method includes receiving, through a user interface presented on a second display, third input for a third scenario; performing a third simulation by modeling the third input for the third scenario in the virtual model of the electrical grid; and providing, for presentation by the first display, a second user interface including one or more visualizations of the results of the first simulation compared to the results of the third simulation.

In some implementations, the method includes receiving, through a second user interface presented on a second display, third input for a third scenario; performing a third simulation by modeling the third input for the third scenario in the virtual model of the electrical grid; and modifying the user interface to include graphics depicting one or more visualizations of the results of the first simulation compared to the results of the third simulation.

In some implementations, the first scenario includes a particular grid configuration, and performing the first simulation for the first scenario includes: adjusting the virtual model of the electrical grid to represent the particular grid configuration; and determining characteristics of the adjusted virtual model of the electrical grid under various simulated conditions.

In some implementations, the particular grid configuration includes at least one of an added or removed power source, an upgraded asset, or an added or removed connection.

In some implementations, the various simulated conditions include at least one of various environmental conditions or various load conditions.

In some implementations, the first scenario includes a particular condition, and performing the first simulation for the first scenario includes: adjusting the virtual model of the electrical grid to represent the particular condition; and determining characteristics of the adjusted virtual model of the electrical grid in various simulated grid configurations.

In some implementations, the particular condition includes at least one of a particular environmental condition or a particular load condition.

In some implementations, the various simulated grid configurations include at least one of added and removed power sources, upgraded assets, or added or removed connections.

In some implementations, the first input includes a first proposed modification to the electrical grid; performing the first simulation for the first scenario by modeling the first input in the virtual model of the electrical grid includes performing a baseline simulation for a geographic location and a time scale included in the first input, and the results of the first simulation include effects of the first proposed modification on results of the baseline simulation.

In some implementations, the second input includes a second proposed modification to the electrical grid that is different from the first proposed modification, and the results of the second simulation include effects of the second proposed modification on results of the baseline simulation.

In some implementations, the method includes: performing a simulation for a baseline scenario for the geographic location and the time scale included in the input. The user interface includes graphics depicting one or more visualizations of the results of the simulation for the first scenario compared to the results of the simulation for the baseline scenario.

In some implementations, the method includes: evaluating the first input and the second input using a set of rules; and displaying a notification that the first input or the second input violates at least one rule of the set of rules.

In some implementations, each rule included in the set of rules includes at least one of a law, a regulation, an equipment limitation, an operational limitation, or an industrial standard.

In some implementations, the virtual model of the electrical grid includes a virtual model of real-world electrical grid assets.

In some implementations, the geographic location includes a location of a selected feeder of a real-world electrical grid.

In some implementations, the method includes, in response to receiving the input for the first scenario, accessing the virtual model of the electrical grid, the virtual model including multiple different model configurations; and selecting, based on the input for the first scenario, (i) a simulation mode including a resolution and scale of the simulation and (ii) one of the multiple different model configurations. Performing the simulation for the first scenario includes executing the simulation in the selected simulation mode using the selected model configuration.

The subject matter described in this specification can be implemented in various embodiments and may result in one or more of the following technical advantages.

The disclosed technology can be used to unify large numbers of factors related to an electric grid investment decision into a single, dynamic interface, through which underlying data are shareable across different simulation engines and analysis tools that can be implemented across physical, financial, environmental, and regulatory domains.

The disclosed technologies can simultaneously analyze multiple grid investment schemes and share and contrast in a comparison view, which might include a table-view or data visualization in charts. The visualizations can provide information indicating how different grid planning decisions will provide differing financial and non-financial returns. A comparison view can be presented showing differences between scenarios regarding environmental, reliability, and regulatory impacts. The interface can return results dynamically, enabling a user to adjust evaluation parameters and assumptions and see the updated results returned almost instantly. Results can then be shared directly with other users in various file formats.

Simulations performed with the disclosed technology can include details at both the transient level, and also time scales in years or decades. The simulations may cover very short periods of time to analyze short-term effects such as peak demand behavior. The simulations may also cover very long periods of time to analyze long-term effects such as accumulated emissions and long term financial returns. The disclosed simulation systems can capture the behavior of assets over their typical lifespans.

The disclosed technologies provide a user-friendly design tool that can be used to configure multiple new electric grid configurations. New configurations can include proposed physical changes to the electric grid, changes to non-physical model inputs, such as hypothetical load growth scenarios, or both.

The disclosed technologies can be used to forecast behavior for potential new configurations, which accurately attributes a physical grid change with a series of effects on the grid. Effects can be evaluated for characteristics of, e.g., power flow, cost of operation, utilization factor, emissions impact, adherence to regulatory requirements, fire risk, etc.

The simulation system can include APIs for relevant existing inputs that ingest inputs from various sources such as IoT enabled data sets, regulatory reports, OEMs, load/generation and weather forecasts, cost assumptions, flexibility parameters/schedule for distributed energy resources (DERs) and demand response, and resilience parameters such as allowable downtime of assets.

The simulation system can implement machine learning models to forecast load patterns, generation, weather, cost projections, and DER behavior to inform forward-looking simulation. Machine learning may also forecast maintenance requirements and downtime based on historical outage and equipment lifecycle data.

The simulation system can perform rapid speed simulation over a variety of dynamic power grid operating conditions over a simulated period of time, e.g., based on historical power grid data. The simulation can include predicted operating conditions over discrete time intervals, e.g., over each hour of a simulated year.

Additional technical advantages of the simulation system include an ability to simulate operations of the electrical grid under various predicted load conditions, including variations due to factors such as seasonal effects, calendar effects, and time of day effects. The simulation system can simulate operations at multiple locations of the electrical grid. The simulation system can simulate various electrical operating characteristics, e.g., current, voltage, power factor, load, etc. at multiple locations, over prolonged simulated periods of time.

The simulation system can model a full transmission and distribution system including electrical properties of grid components, active loads and generators with associated forecasted behavior, and centralized and distributed control. The grid models can enable simulations across any time scale of interest, e.g., from nanoseconds to years, and any geographical area of interest, e.g., from centimeters to thousands of kilometers.

Other implementations of the above aspects include corresponding systems, apparatus, and computer programs, configured to perform the actions of the methods, encoded on computer storage devices. The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
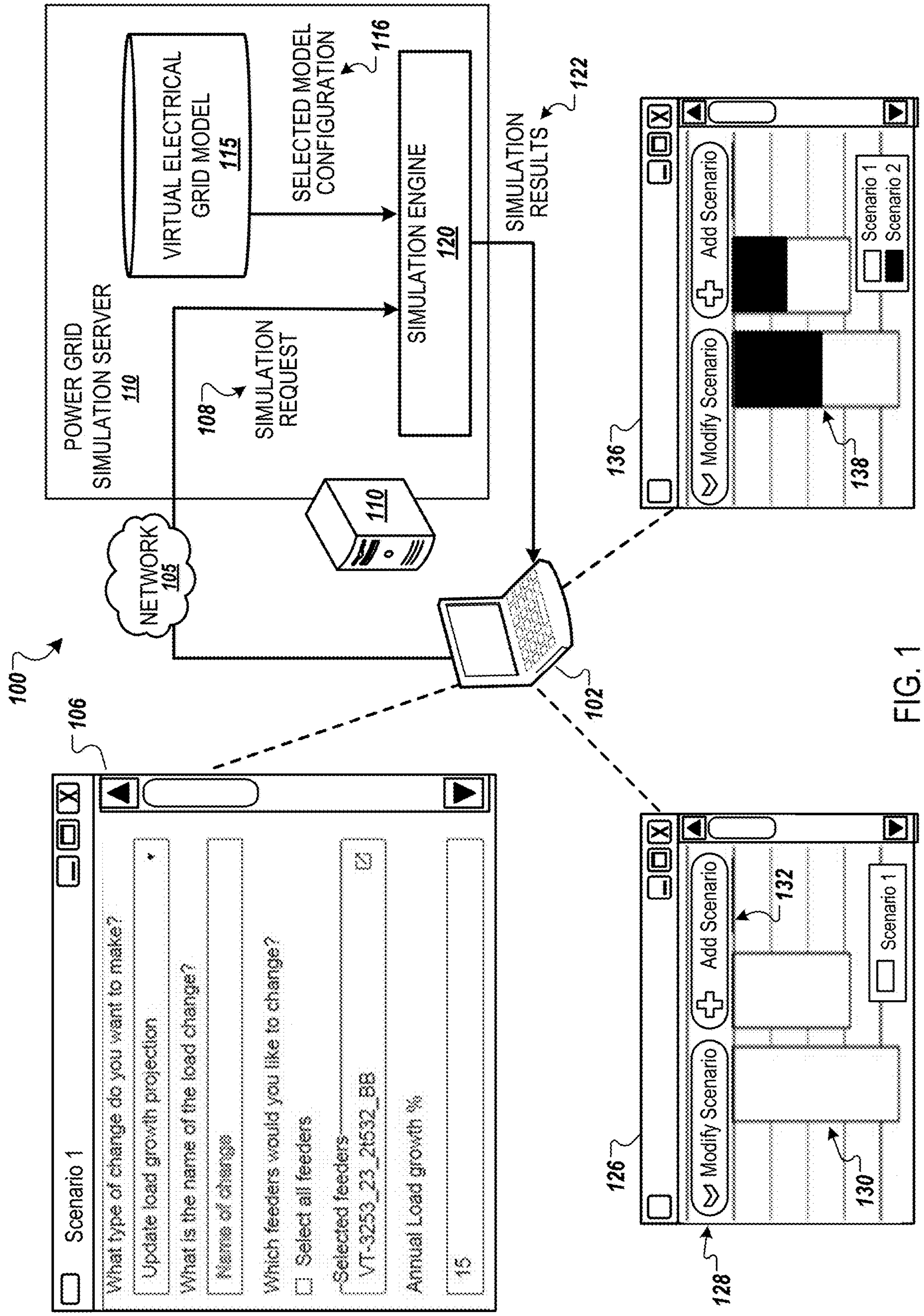
FIG. 1 illustrates an example system for simulation of modifications to an electrical grid.

FIG. 1 is a diagram showing an example system 100 for simulation of modifications to an electrical grid. The system 100 includes a power grid simulation server 110 and a user device 102. The server 110 includes an electrical grid model 115 and a simulation engine 120. The user device 102 may communicate with the server 110 for example, over a network 105.

In some examples, the electrical grid model 115, the simulation engine 120, or both, can be separate from the server 110 and may communicate with the server 110 over the network 105. The network 105 can include public and/or private networks and can include the Internet.

The user device 102 can be an electronic device such as a computing device. The user device 102 can be, for example, a desktop computer, a laptop computer, a smart phone, a cell phone, a tablet, a PDA, etc.

The server 110 is a server system and can include one or more computing devices. In some implementations, the server 110 may be part of a cloud computing platform. The server 110 may be maintained and operated, for example, by an electrical grid operator such as an electrical power utility or a third party.

The system 100 displays a first user interface, e.g., input user interface 106 to a user through the user device 102. The input user interface 106 can include an input form to enable a user to input a simulation request 108.

In some examples, the simulation request 108 can include a request for analysis of a first scenario such as an electric grid project. The simulation system can receive, through the input user interface 106, data indicating a user selection of baseline data input sources, data indicating a geographic area for the analysis, and data indicating a user selection of a time horizon for the project. In some examples, the geographic location can include a location of a selected feeder of a real-world electric grid. In some examples, the time horizon can include a start and stop time for the simulation. The start time and stop time can each include a calendar date and time of day, with or without a specified time zone.

The simulation system can also receive, through the input user interface 106, user input for a scenario for the analysis. The scenario can include one or more proposed changes to the electric grid that are to be simulated. For example, a first scenario can include an addition of a power generation source to the electric grid. The system can receive a user selection of a location and type of the proposed added power generation source, and ratings of the proposed added power generation source. The system can also receive user input indicating simulation assumptions. In some examples, a user may provide input including textual code files that encode grid information, drawn diagrams that encode grid information, and data in a spreadsheet format.

The input user interface 106 can include design tools that can be used to configure proposed modifications to electric grid configurations. Design tools can include, for example, forms, type fields, drag-and-drop selections, etc. Design tools can enable a user to add and remove various grid assets and connections between grid assets. In some examples, design tools can include editable maps of the electric grid. For example, a design tool can enable a user to drag-and-drop a virtual power source to a location of the electric grid as represented in a map view. In another example, a design tool can enable a user to draw a building at a location of the electric grid as represented in a map view, and to draw or drag-and-drop a connection between the building and the electric grid.

Modified electric grid configurations can include simulated physical changes to the electric grid, such as adding and removing power generation sources, and simulated non-physical changes, such as hypothetical load growth scenarios. Example configurations can include, for example, an added or removed power source, an upgraded asset, or an added or removed connection. For assets that are added or modified, the input user interface 106 can include options for providing asset characteristics, e.g., electric ratings of grid assets. The options for providing asset characteristics can include, for example, text fields, drop-down menus, selectable buttons, etc. Example input user interfaces 106 are shown in FIGS. 2 to 9.

The user device 102 sends the simulation request 108 to the power grid simulation server 110, e.g., over the network 105. The simulation request 108 includes the parameters input by the user, e.g., the location, scenario, change, data source, filters, and requested output. The simulation engine 120 receives the simulation request 108.

In response to receiving the simulation request 108, the simulation engine 120 accesses the virtual electrical grid model 115. In some examples, the electrical grid model 115 is stored in a database that is stored by or is accessible to the server 110. The electrical grid model 115 can be a model of a real-world electrical power grid that transmits electrical power to loads such as residential and commercial buildings.

The electrical grid model 115 can include a topological representation of a power grid or a portion of the power grid. The detail of the electrical grid model 115 is sufficient to allow for accurate simulation and representation of steady-state, dynamic and transient operation of the grid.

The simulation engine 120 selects a model configuration 116 of the virtual electrical grid model 115. The selected model configuration 116 can include, for example, one or more layers, versions, and data sources. The simulation engine 120 selects a simulation mode for the simulation. The simulation mode can include a time scale, time resolution, spatial scale, and spatial resolution of the simulation.

The simulation engine 120 performs a simulation, or series of simulations, for the first scenario by modeling the input in the virtual electrical grid model 115. In some examples, the simulation can run using real time input data streams from sensors in the field. In some examples, the simulation can run using as inputs historical data from sensors and estimates of historical and future parameters, such as expected load characteristics at a given instant and location. Based on the simulation or series of simulations, the simulation engine 120 outputs simulation results 122.

The simulation server 110 outputs the simulation results 122 to the user device 102. The user device 102 can display the simulation results 122 for viewing by a user, e.g., through an output user interface 126.

The user device 102 modifies the user interface to display the simulation results 122 to a user, e.g., as shown in output user interface 126. The output user interface 126 can show visualizations 130 of simulation results for the input scenario, e.g., the first scenario. Visualizations can include, for example, tables, charts, graphs, and maps. The user interface can also enable a user to adjust evaluation parameters and assumptions after viewing the simulation results. For example, the user interface can include various menus including options for requesting additional simulations and modified simulations. In some examples, the output user interface 126 can include a menu of options 128 for modifying the input scenario and a menu of options 132 for inputting an additional scenario. Example output user interfaces 126 are shown in FIGS. 10 to 16.

The user device 102 can receive, through the output user interface 126, a selection from the menu of options 128 for modifying the input scenario. For example, user device 102 can receive input modifying the power rating of a proposed added power source in the first scenario. The user device 102 sends a modified simulation request to the power grid simulation server 110, e.g., over the network 105. The simulation engine 120 receives the modified simulation request.

Based on the modified simulation request, the simulation engine 120 can perform an updated simulation. For example, the simulation engine 120 can perform a modified simulation or series of simulations by modeling the modified input in the virtual electrical grid model 115.

The simulation engine 120 can provide updated results of the modified simulation for the first scenario to the user device 102. The user device can display updated results for the first scenario through an updated user interface, e.g., output user interface 136. The output user interface 136 can include visualizations 138 of the results of the simulation compared to the results of the modified simulation.

In some examples, the user device 102 can receive, through the output user interface 126, a selection from the menu of options 132 to input an additional scenario. In response to receiving the selection to input the additional scenario, the user device 102 can modify the user interface to include graphics depicting fields for receiving input, e.g., as shown in input user interface 106 for receiving input for the additional scenario. The user device 102 can then receive, through the input user interface 106, input for a second scenario. For example, the second scenario can include an upgrade of a currently existing power generation source.

The user device 102 sends an additional simulation request for the second scenario to the power grid simulation server 110, e.g., over the network 105. The simulation engine 120 receives the additional simulation request. Based on the additional simulation request, the simulation engine 120 can perform another simulation For example, the simulation engine 120 can perform a simulation or series of simulations by modeling the input for the second scenario in the virtual electrical grid model 115.

The simulation engine 120 can provide results of the simulation for the second scenario to the user device 102. The user device can display results for the first scenario and the second scenario through an updated user interface, e.g., output user interface 136. The output user interface 136 can include visualizations 138 of the results of the simulation for the first scenario compared to the results of the simulation for the second scenario.

The results displayed through the output user interface 136 can include a comparison view showing evaluated parameters of each of multiple scenarios compared to each other and compared to a baseline scenario. For example, the user interface can show trend lines of power quality over time for each of the baseline data input, the first scenario, and the second scenario, shown on the same graph. The user interface can also show a map view indicating characteristics of the electric grid as simulated based on each of the scenarios. Results of the simulation provided through the user interface can be time varying. For example, the results can be displayed for a user-selected point in time, or time duration, that falls within the time horizon for the project. In some examples, results can be aggregated, averaged, or both, over simulated time durations.

The results displayed through the output user interface 136 can be used for electrical grid planning and operational decisions. For example, a user can evaluate the displayed results in order to make decisions related to which power sources to operate at various times of day, times of week, times of year, etc. The displayed results can also aid in decisions related to power restoration and power shedding.

In some examples, a user can evaluate the displayed results in order to make decisions related to proposed modifications of the electrical grid. For example, a user can input multiple scenarios and view a comparison between impacts of each scenario and cumulative impacts of the multiple scenarios. In some implementations, multiple users can each input scenarios to the power grid simulation server 110 and a user interface can be presented to a different user in order to evaluate the scenarios. For example, a user at an electrical grid utility can view results of scenarios proposed by multiple different contractors. The user at the electrical grid utility can compare the proposed scenarios in order to determine financial, operational, and environmental impacts of each of the proposed scenarios.

In some implementations, the power grid simulation server 110 can use machine learning processes to improve simulation results over time. For example, the simulation engine 120 may simulate a proposed change to the electrical grid and produce simulation results. The proposed change may then be made to the real-world electrical grid and incorporated into the virtual electrical grid model 115. The power grid simulation server 110 can compare real-world impacts of the change to the previous simulation results. Based on comparing the real-world impacts of the change to the previous simulation results, the power grid simulation server 110 can update parameters of the virtual electrical grid model, the simulation engine 120, or both.

Figure 2:
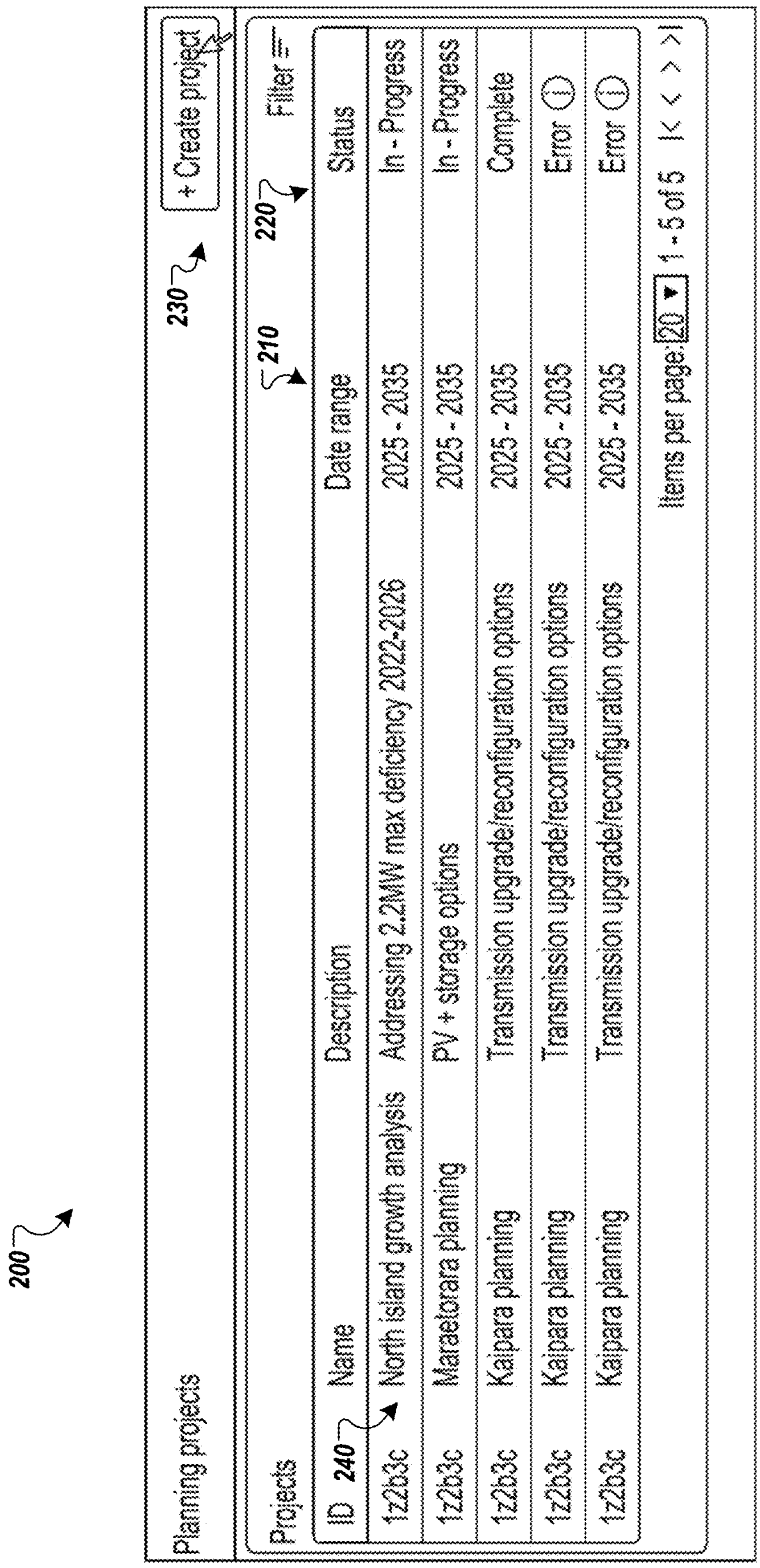
FIG. 2 illustrates an example input user interface showing a list of planning projects.

FIG. 2 illustrates an example input user interface 200 showing a list of planning projects. The list of planning projects includes time scales 210 for each scenario and a status 220 of each scenario. The list of planning projects includes a “North island growth analysis” project 240. The described purpose of the project 240 is to address a 2.2 megawatt (MW) deficiency between 2022 and 2026. The user interface 200 includes a selectable option 230 for creating a new project to be evaluated.

Figure 3:
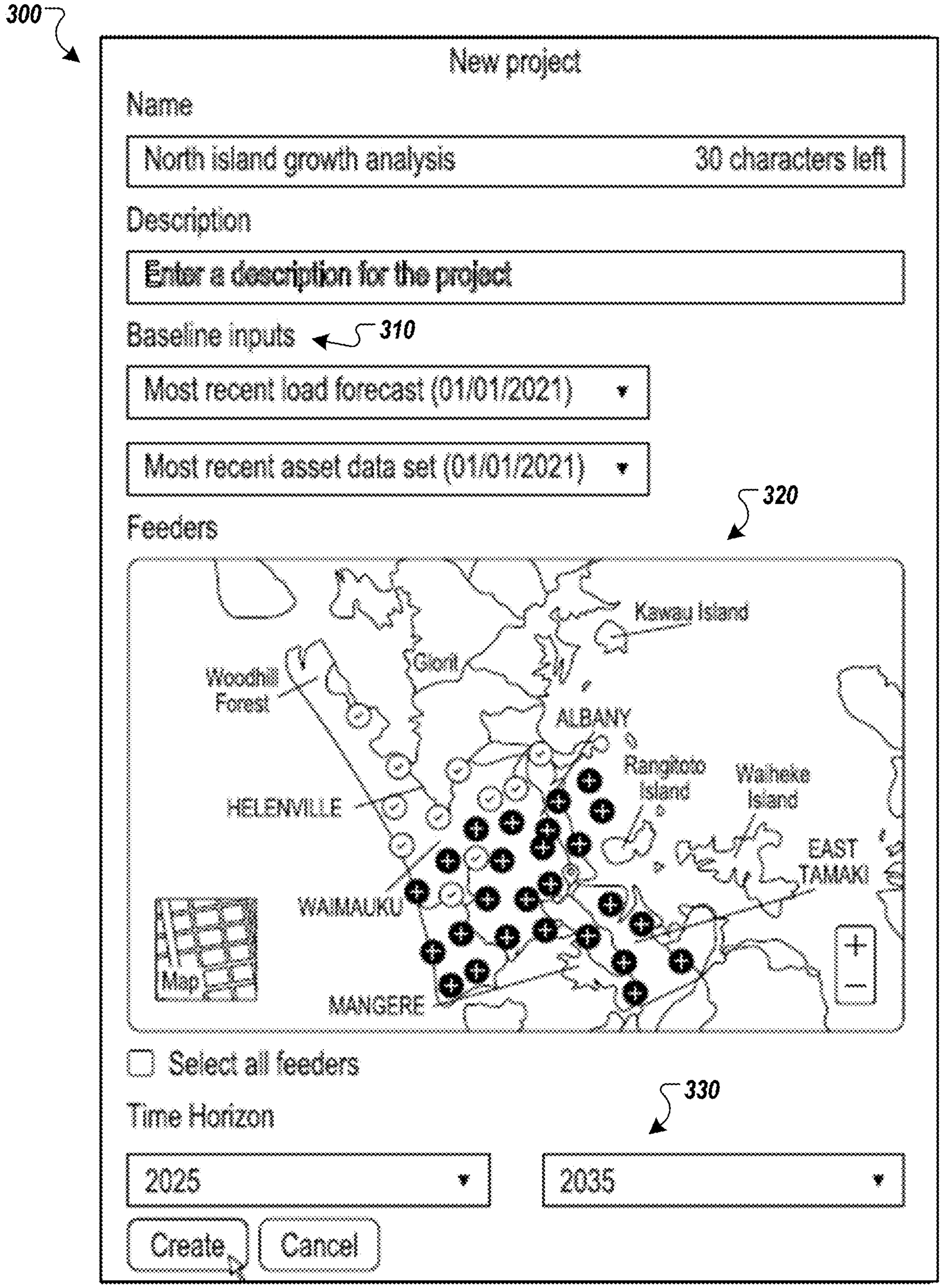
FIG. 3 illustrates an example input user interface showing input for a new planning project.

FIG. 3 illustrates an example input user interface 300 showing input for a planning project. Specifically, FIG. 3 illustrates an example input user interface 300 showing input for the project 240. The input user interface 300 includes fields for selecting baseline inputs 310. The baseline inputs 310 specify sources of data to be used in the scenario. In this example, the selected baseline inputs for load and asset data are the most recent load forecast and the most recent asset data set.

In some implementations, the baseline inputs can be set to default data sources. For example, the default data sources can include the most recent versions of data sources. The user interface 300 can enable a user to change the input data sources from the default data sources.

Enabling the user to select data sources can improve confidence in simulation results. For example, a user can select to input data from public or proprietary sources. The user can also perform multiple simulations using different data sources in order to compare results of simulations that use the different data sources. In some implementations, displayed results can be labeled with the source or sources of data that were used to produce the results. Thus, a user viewing the result can evaluate the accuracy, quality, and consistency of the simulation results.

The input user interface 300 also includes a map view 320 for inputting a geographic location for the scenario. In this example, the geographic location can be input by selecting feeders of an electrical distribution as displayed in the map view. In some examples, a geographic location can be input in other ways, e.g., by drawing a boundary on a map, by selecting a town, county, or state, by inputting latitudinal and longitudinal boundaries, etc.

The input user interface 300 also includes drop-down menus 330 for inputting a time horizon, or time scale, for the scenario. In some examples, a time scale can be input in other ways, e.g., by typing in a text field, selecting dates on a calendar, adjusting a sliding element on a timeline, etc. In some examples, the time scale can include a start and stop time for the simulation. The start time and stop time can each include a calendar date and time of day. In some examples, the start time and stop time can include a specified time zone for the scenario.

Figure 4:
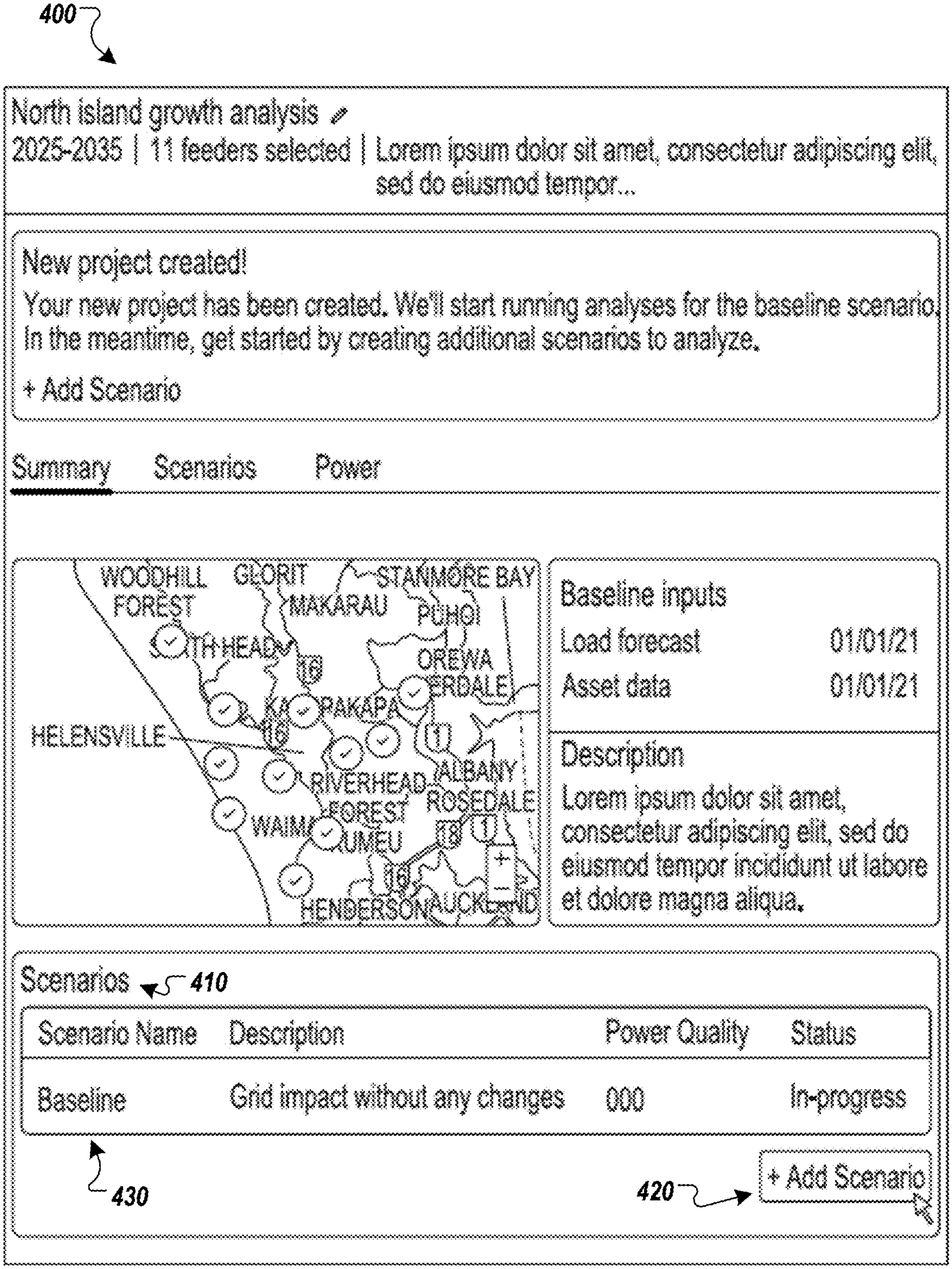
FIG. 4 illustrates an example input user interface showing detailed input for a new planning project.

FIG. 4 illustrates an example input user interface 400 showing detailed input for a new planning project. The input user interface 400 shows options that have already been selected for the project. The input user interface 400 also provides a selectable option 420 for adding one or more scenarios.

The input user interface 400 also shows a list of scenarios 410 that are being analyzed. In this example, the simulation server is performing a simulation of the baseline scenario 430. The baseline scenario 430 can be, for example, a simulation of the virtual grid without modifications or without the proposed modification. In some examples, simulation of the baseline scenario 430 generates baseline results that assume no changes are made to the current virtual model of the selected portions of the electrical grid. The baseline scenario 430 can be analyzed based on the selected geographic location, time scale, and input data sources.

Figure 5:
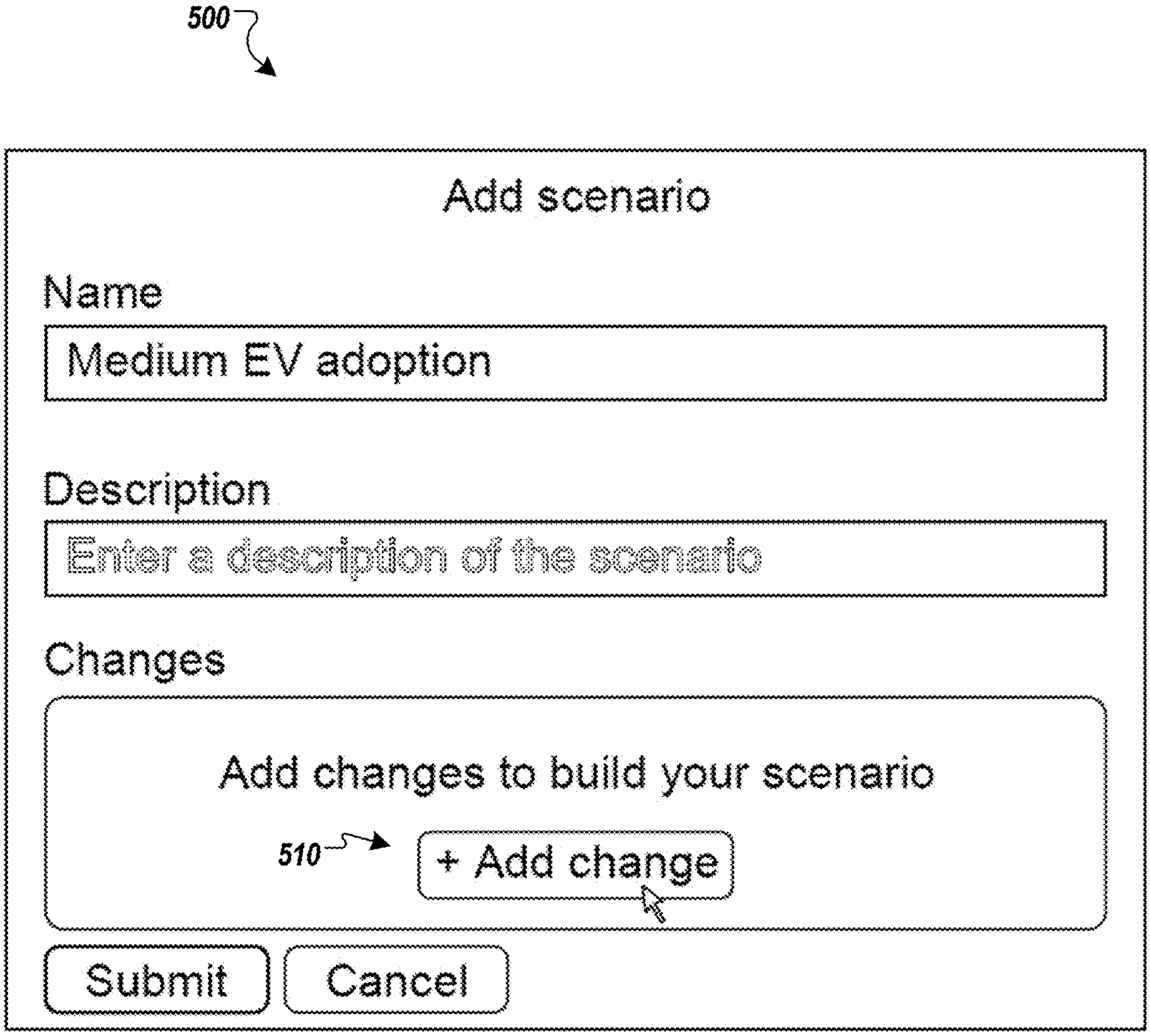
FIG. 5 illustrates an example input user interface showing input for adding a scenario.

FIG. 5 illustrates an example input user interface 500 showing input for adding a scenario. The added scenario can include one or more changes, or modifications, to the electrical grid. The input user interface 500 includes a selectable option 510 for adding a change.

Figure 6:
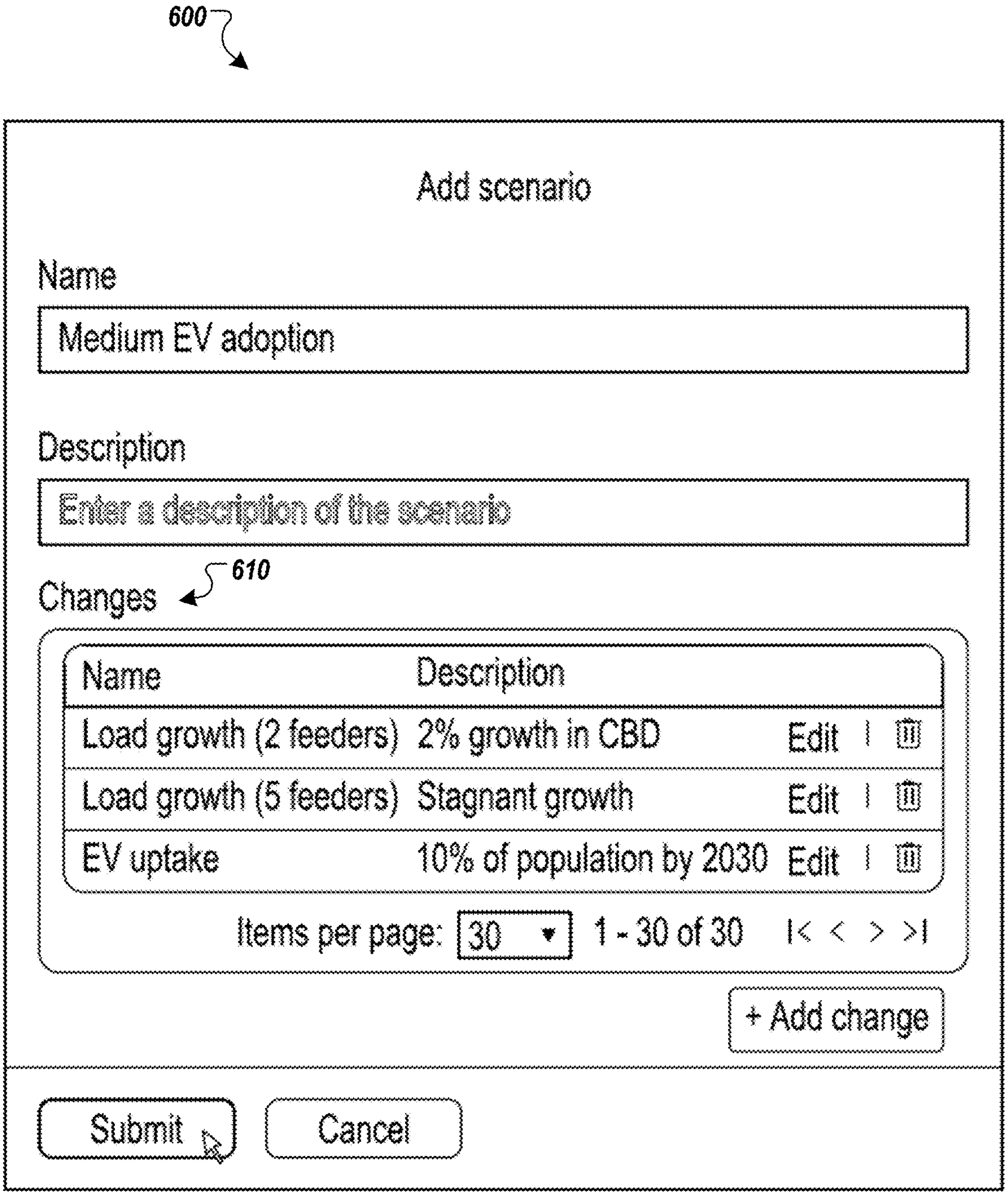
FIG. 6 illustrates an example input user interface showing input for simulated changes in a scenario.

FIG. 6 illustrates an example input user interface 600 showing input for simulated changes in a scenario. The input user interface 600 shows a list of changes 610 that were input through user interface 500.

In some implementations, the input user interface 600, or other input user interface, can prompt a user to select certain changes or simulation conditions. The simulation system can prompt changes and conditions, e.g., based on previous simulations requested by the same user or by other users. In some examples, the simulation system can prompt an entry into a second input field based on input that was entered into a first input field. For example, a user may input a change that includes adding an electrical vehicle charger to the electrical grid. The simulation system can prompt the user to input simulation conditions that anticipate load growth, e.g., of two percent. In some examples the suggested anticipated load growth can be based on historical load growth. In some examples, the suggested anticipated load growth can be based on load growth estimated input by other users who have performed similar simulations.

Figure 7:
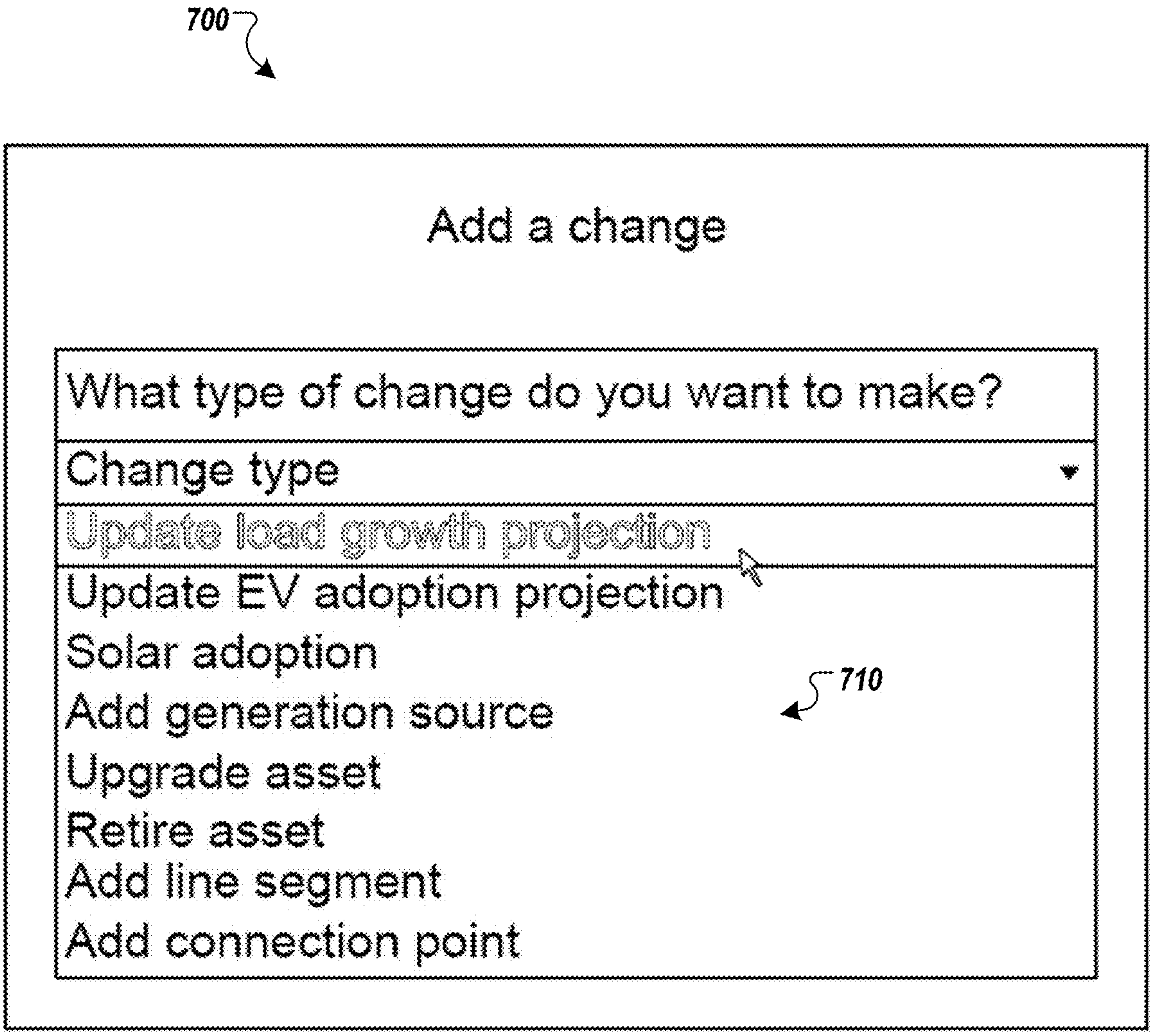
FIG. 7 illustrates an example input user interface showing options for simulated changes in a scenario.

FIG. 7 illustrates an example input user interface 700 showing options for simulated changes in a scenario. The input user interface 700 includes a drop-down menu 710 showing various possible changes that can be input to the simulation.

Figure 8:
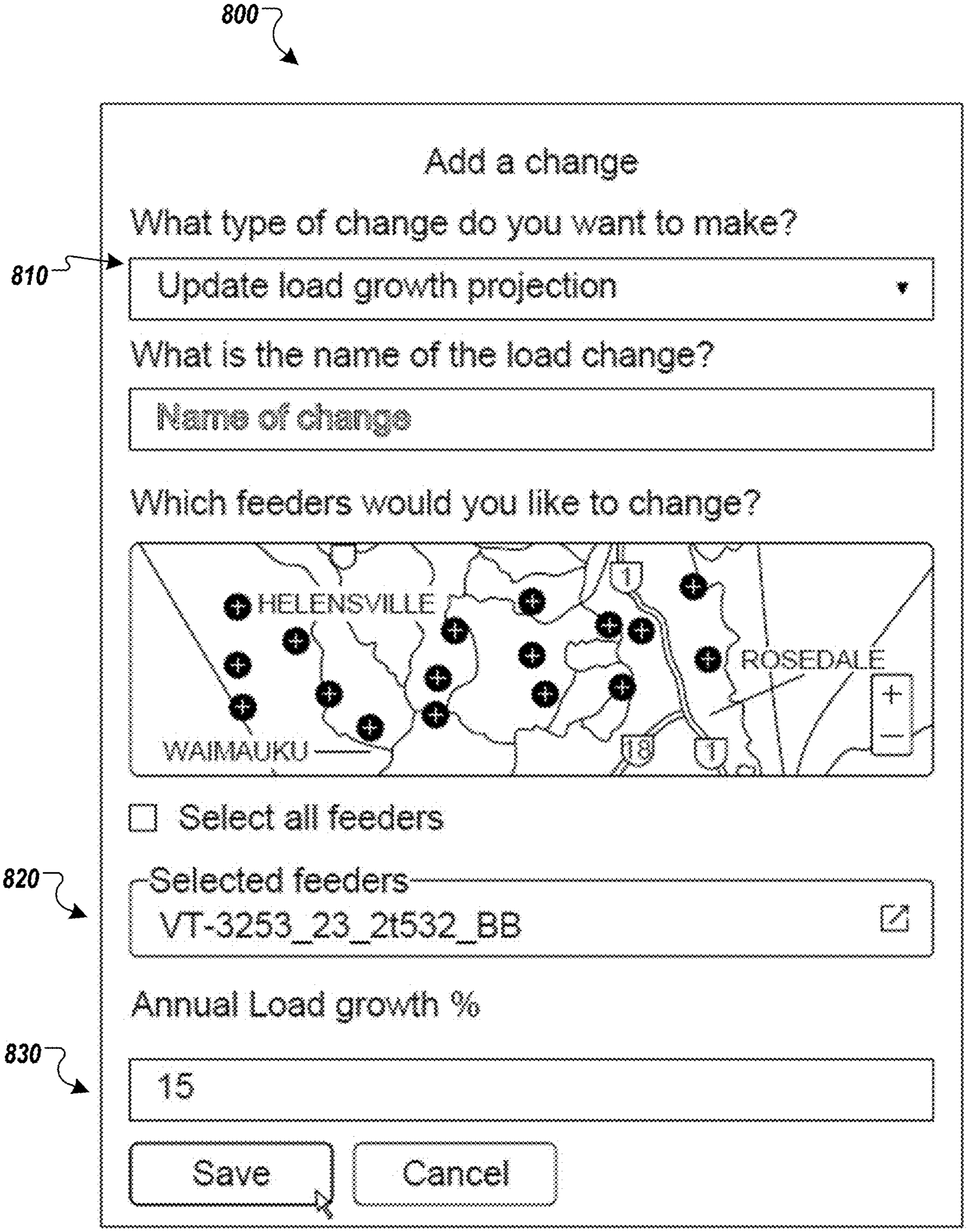
FIG. 8 illustrates an example input user interface for modifying input for a simulated load change in a scenario.

FIG. 8 illustrates an example input user interface 800 for modifying input for a simulated load change in a scenario. In this example, an updated load growth projection 810 is input to the user interface 800. The user interface 800 provides an option for a user to select one or more feeders 820 and to input an annual load growth percentage 830.

The simulation system can receive, through the user interface 800, input indicating a change to a previously requested simulation. Upon receiving the input indicating the change, the simulation system can perform a modified simulation including the change. When performing the modified simulation, the simulation system can bypass performing the baseline simulation. For example, since the baseline scenario has already been evaluated, the simulation system can evaluate the modified simulation in comparison with the previously evaluated baseline results. Thus, enabling modification of the input data can improve speed and efficiency of performing simulations. When performing a modified simulation, the simulation system can evaluate the modification without re-performing the initial baseline scenario simulation.

In some implementations, the simulation system can resolve conflicts between changes input by a user. For example, a user may input two or more changes that conflict with one another. To manage conflicts, the simulation system can include a conflict management ruleset. The conflict management ruleset can include a hierarchy of conflict resolution. In some examples, the conflict resolution hierarchy can be set by a user. In some examples, the conflict resolution hierarchy can be based on regulations such as laws, codes, regulations, etc. An example rule can be a minimum amount of power that must be available to a particular feeder, a maximum rating for a power grid asset, a minimum distance between two power grid assets, etc.

In some examples, input into a user interface, e.g., user interface 800, can be evaluated using a set of rules. The set of rules can include rules based on laws, regulations, equipment limitations, operational limitation, industrial standards, or any combination of these. The simulation system may determine that an input violates one or more rules. In response to determining that the input violates the one or more rules, the simulation system can provide a notification indicating the rule violation. For example, the simulation system can display, through a user interface, e.g., user interface 800, a warning that the input violates a rule. The simulation system can then provide options to the user to waive the rule, or to edit the input to avoid violating the rule.

Figure 9:
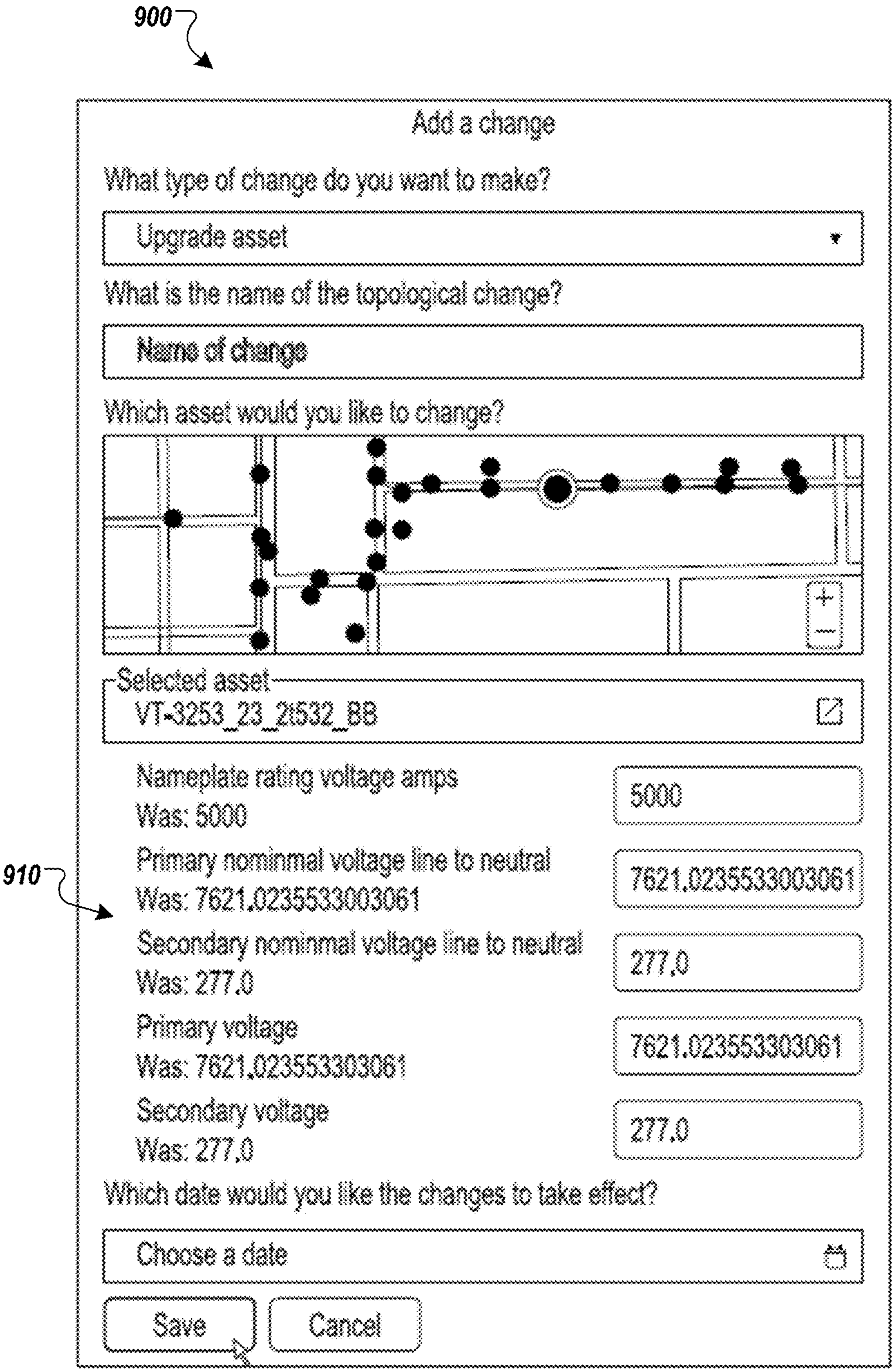
FIG. 9 illustrates an example input user interface showing detailed input for a simulated asset upgrade change in a scenario.

FIG. 9 illustrates an example input user interface 900 showing detailed input for a simulated asset upgrade change in a scenario. The user interface 900 provides input fields 910 for specifying ratings of an upgraded power grid asset.

Figure 10:
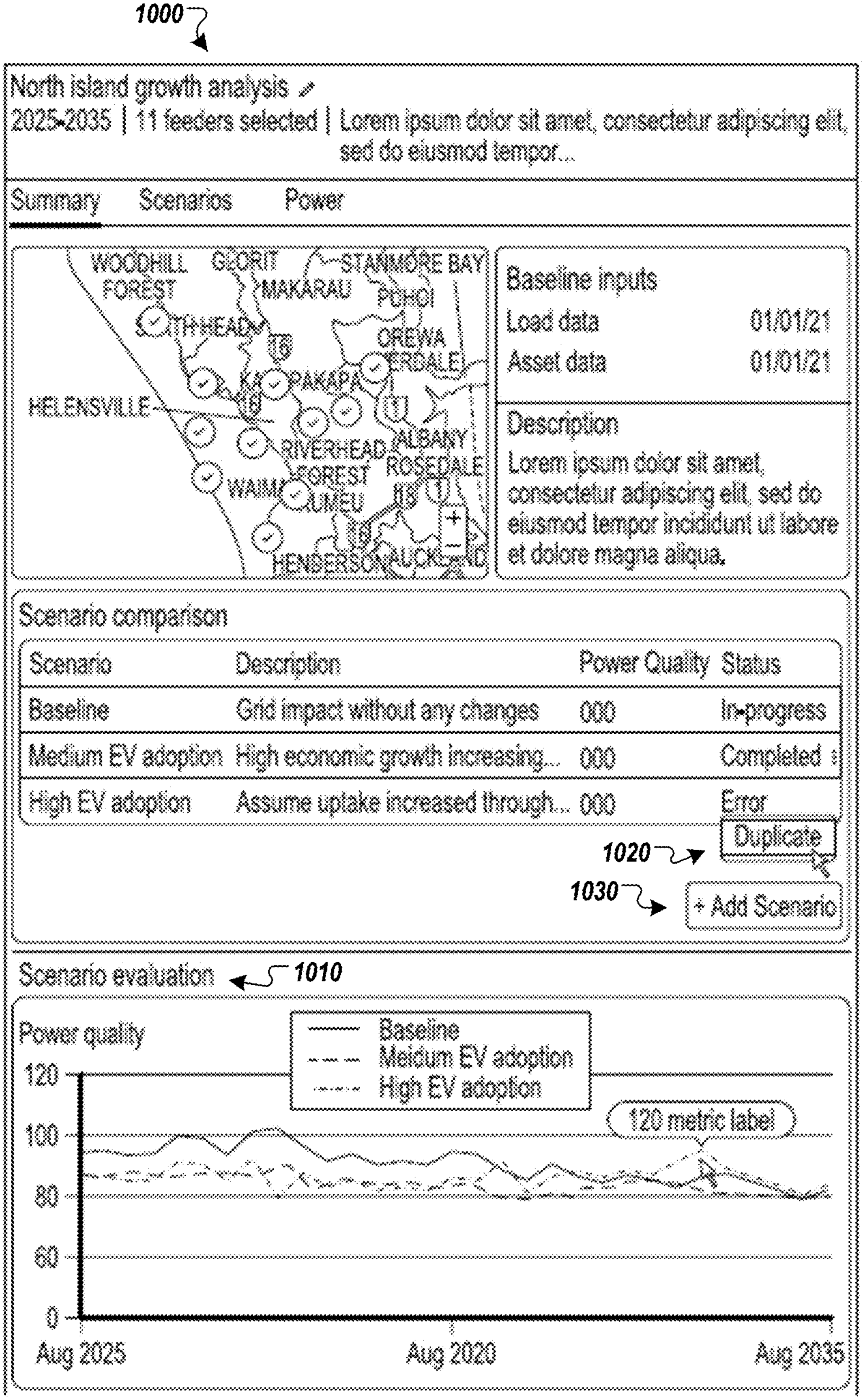
FIG. 10 illustrates an example output user interface showing a comparison of power quality for load growth scenarios.

FIG. 10 illustrates an example output user interface 1000 showing a comparison of power quality for load growth scenarios. The user interface 1000 includes a scenario evaluation graph 1010. The graph 1010 shows power quality over time. The results displayed in the graph 1010 show effects of proposed modifications on the results of the baseline simulation. The modifications can include various levels of electrical vehicle (EV) adoption within the selected geographic location. For example, the graph 1010 shows baseline results compared to a first proposed modification of medium EV adoption, and compared to a second proposed modification to high EV adoption.

The output user interface 1000 includes a selectable option 1020 in a drop-down menu for duplicating a scenario. In response to selection of the selectable option 1020, the simulation system can duplicate the selected scenario. The simulation system can then present an input user interface, e.g., user interface 800, for receiving input data indicating modifications and adjustments to the duplicated scenario. In this way, the system enables a user to generate new scenarios from pre-existing scenarios, instead of creating each scenario anew.

The output user interface 1000 includes a selectable option 1030 for adding a new scenario. In response to selection of the selectable option 1030, the simulation system can present an input user interface, e.g., user interface 500, for receiving input data indicating parameters for the new scenario. In this way, the system enables a user to generate new scenarios while preserving previously run scenarios. After multiple scenarios have been generated and evaluated, the simulation system can present output user interfaces showing results of the multiple scenarios. The results of the multiple scenarios can be presented, e.g., in a comparison view or in a cumulative view.

Figure 11:
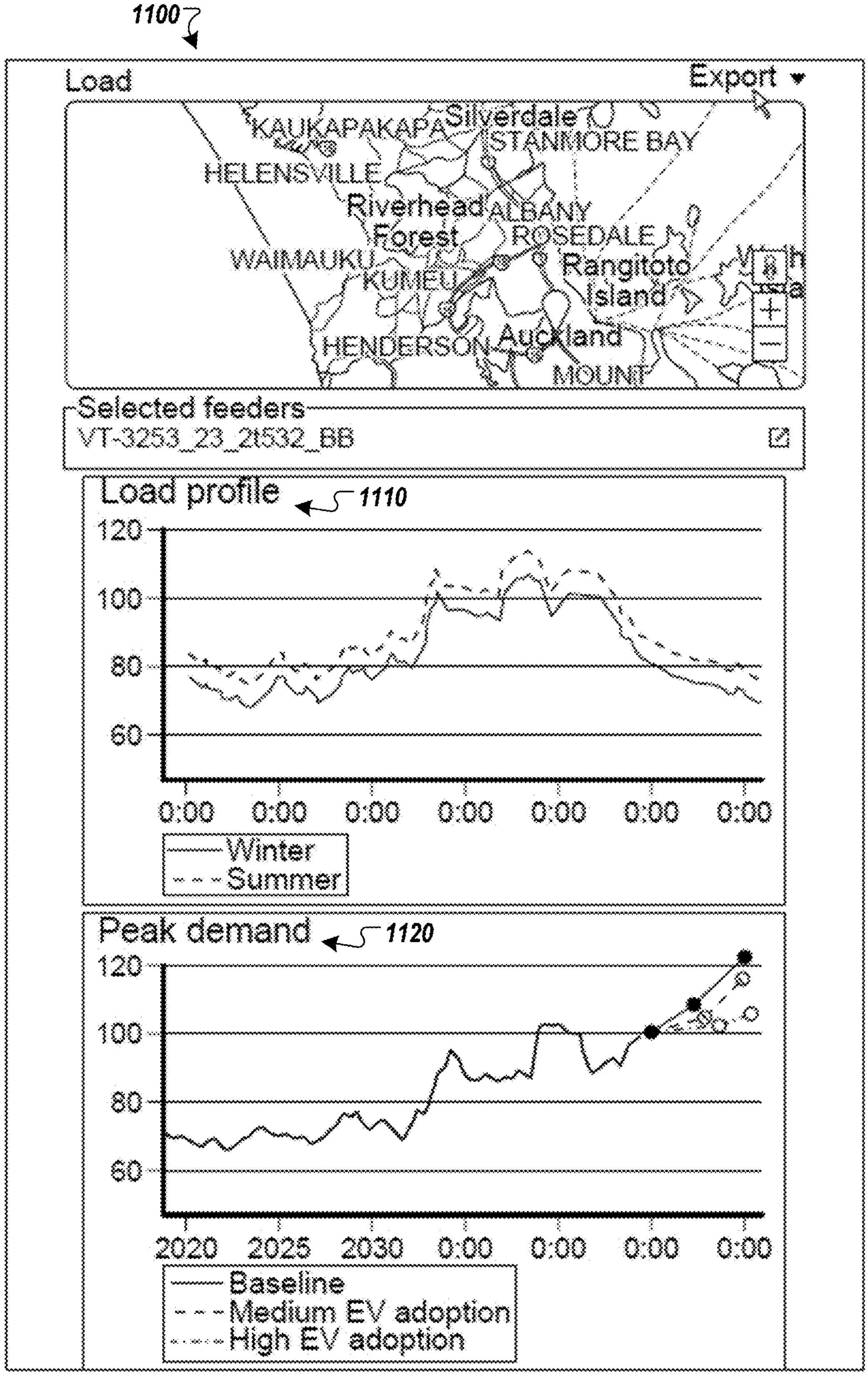
FIG. 11 illustrates an example output user interface showing a comparison of load profiles and peak demand for load growth scenarios.

FIG. 11 illustrates an example output user interface 1100 showing a comparison of load profiles and peak demand for load growth scenarios. The user interface 1100 includes a load profile graph 1110 and a peak demand graph 1120 for simulated conditions and configurations.

The load profile graph 1110 and peak demand graph 1120 each show results of an evaluation of a scenario that includes a particular electrical grid configuration evaluated under various conditions. Evaluated conditions can include, for example, environmental conditions and load conditions.

For example, the load profile shown in graph 1110 shows results of simulation of a particular grid configuration evaluated under various environmental conditions. Specifically, the environmental conditions include weather conditions that correspond to winter and to summer. Similarly, the peak demand graph 1120 shows results of a simulation of particular grid configuration evaluated under various load conditions. Specifically, the load conditions include baseline load, load in the event of medium levels of adoption of EVs, and load in the event of high levels of adoption of EVs.

In some examples, the simulation system can evaluate a scenario that includes a particular condition or set of conditions evaluated for different electrical grid configurations. For example, a scenario including an environmental condition of a weather storm can be evaluated for electrical grid configurations with one power source, with two power sources, or with three power sources online. Results of the simulations with the various electrical grid configurations under the particular environmental conditions can be shown in a comparison view.

In another example, a scenario including a load condition of mid-day summer load demand can be evaluated for electrical grid configurations including a configuration in which all water heaters were shed from the grid, a configuration in which half of all water heaters were shed from the grid, and a configuration in which no water heaters were shed from the grid. Results of the simulations with the various electrical grid configurations under the particular load conditions can be shown in a comparison view.

Figure 12:
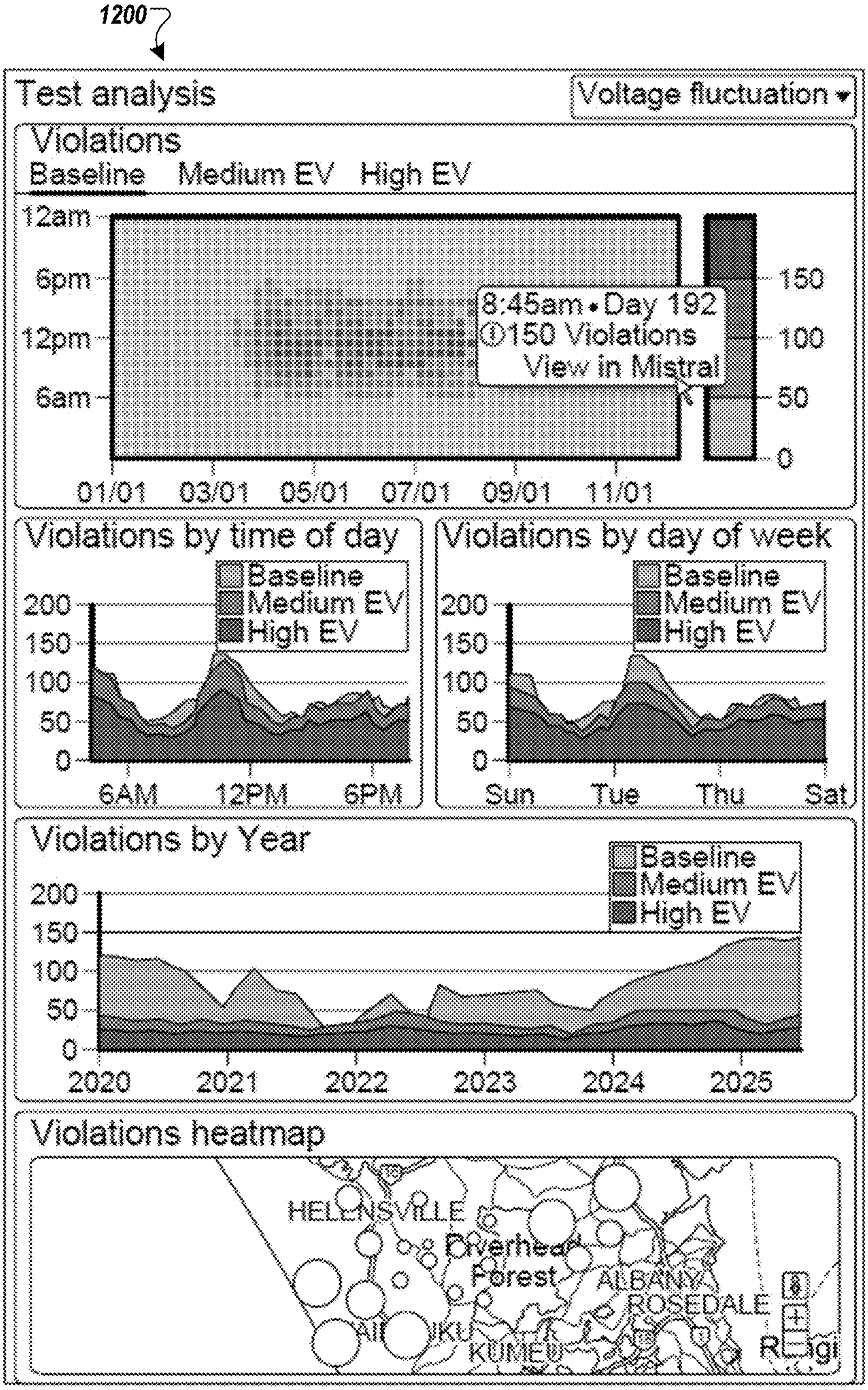
FIG. 12 illustrates an example output user interface showing a comparison of violations for load growth scenarios.

FIG. 12 illustrates an example output user interface 1200 showing a comparison of violations for load growth scenarios. The output user interface 1200 includes various graphs showing comparison views between violations in a baseline scenario, a medium EV adoption scenario, and a high EV adoption scenario.

Figure 13:
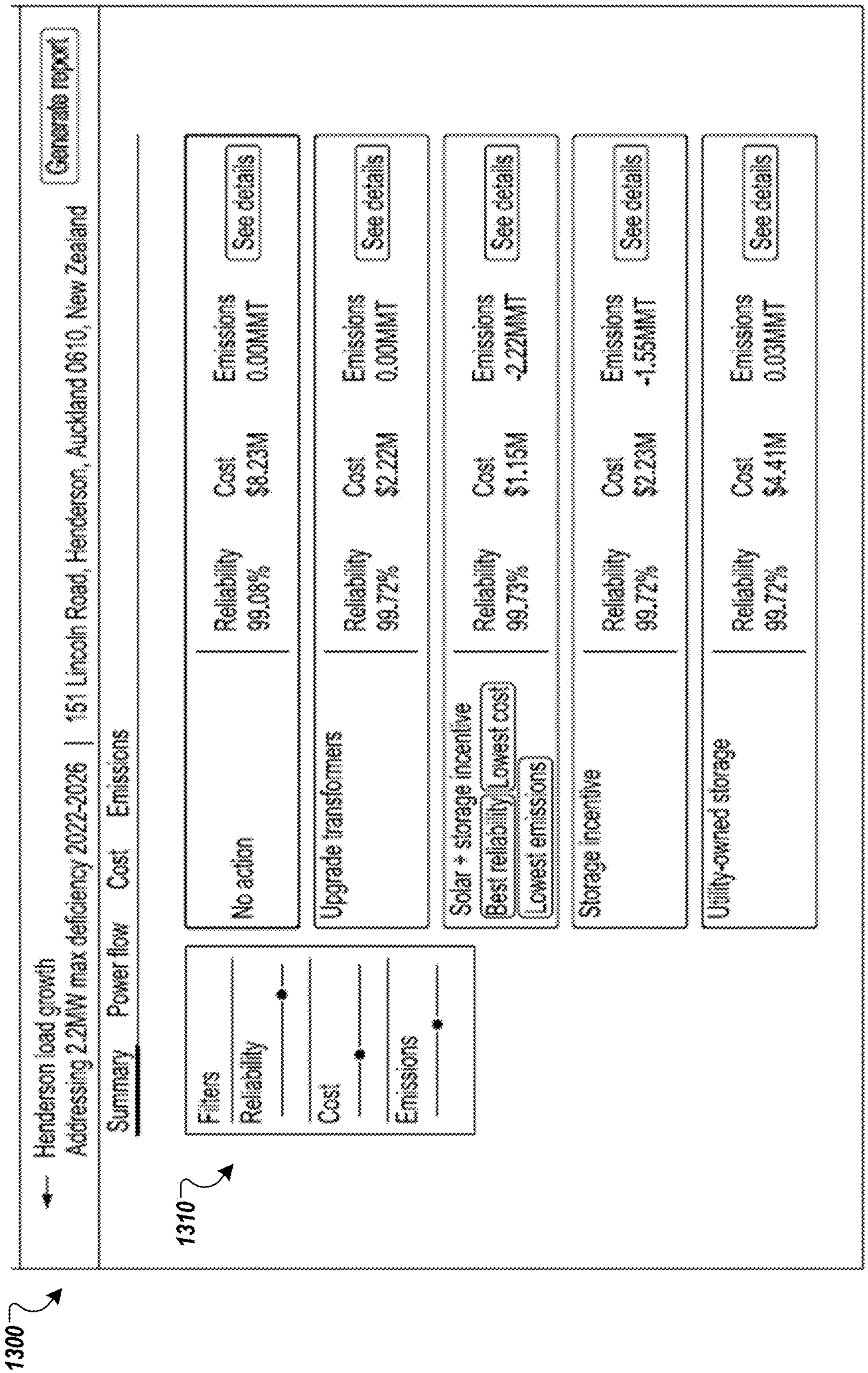
FIG. 13 illustrates an example output user interface showing options for modifying the input for options for addressing a future power deficiency.

FIG. 13 illustrates an example output user interface 1300 showing options for modifying the input for options for addressing a future power deficiency. The user interface 1300 includes a menu 1310 that includes filters. The filters can be applied to the results in order to prioritize certain requirements over other requirements. For example, a cost filter can be set to a low level and an emission filter can be set to a higher level in order to prioritize cost effectiveness over environmental impacts for the various scenarios. In some examples, the menu 1310 can include options for modifying the input, e.g., by changing a rating of one or more electric grid assets, by changing a time scale of the scenario, by changing a type of power source, by changing a location of a power source, etc.

Figure 14:
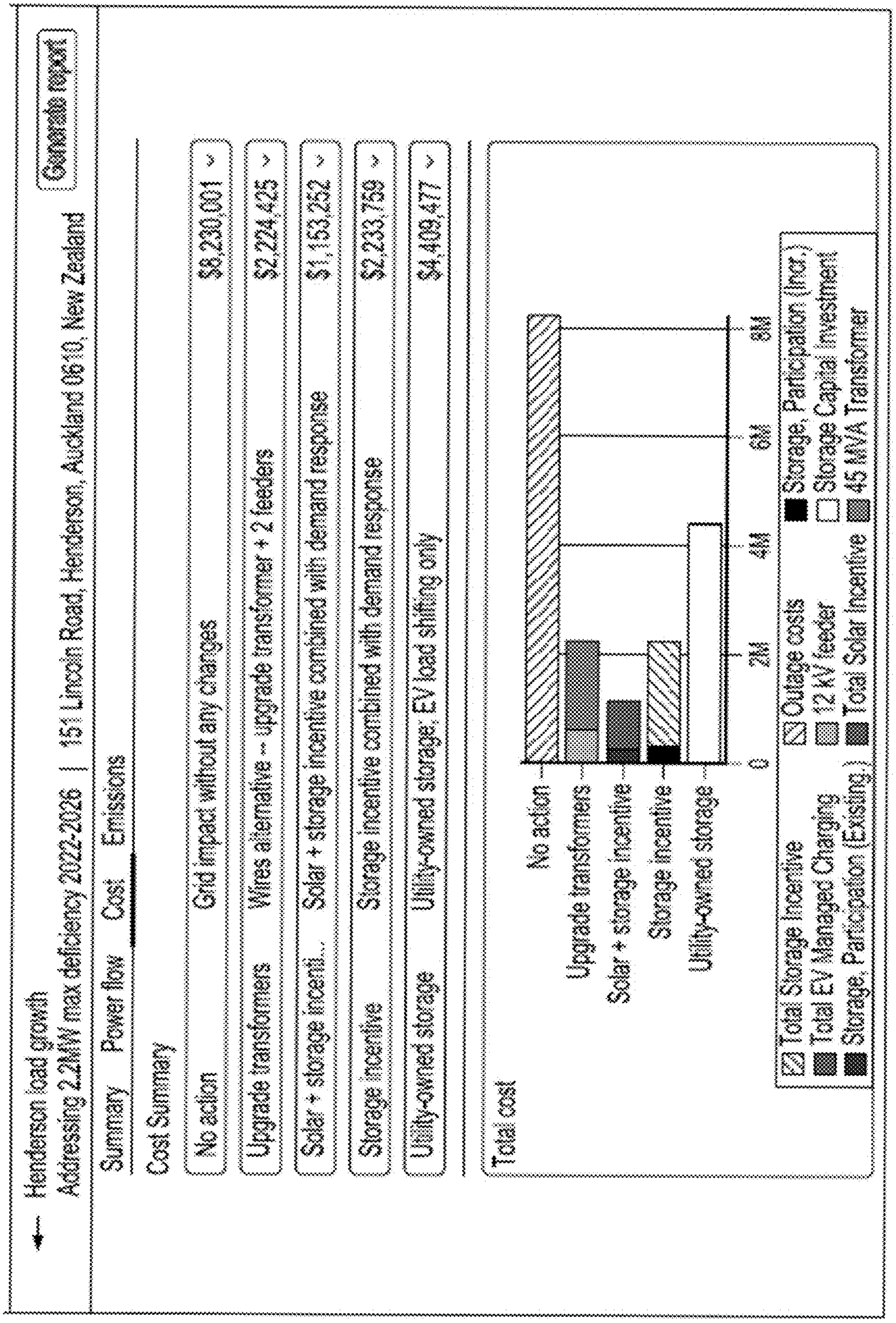
FIG. 14 illustrates an example output user interface showing a cost comparison for options for addressing a future power deficiency.

FIG. 14 illustrates an example output user interface 1400 showing a cost comparison for options for addressing a future power deficiency. In some examples, cost comparisons can include direct and indirect costs of electric grid modifications. For example, building a power source in a particular location may result in indirect financial effects such as tax benefits. The virtual electrical grid model 115 can include financial models that account for the indirect financial impacts of various electrical grid decisions.

Figure 15A:
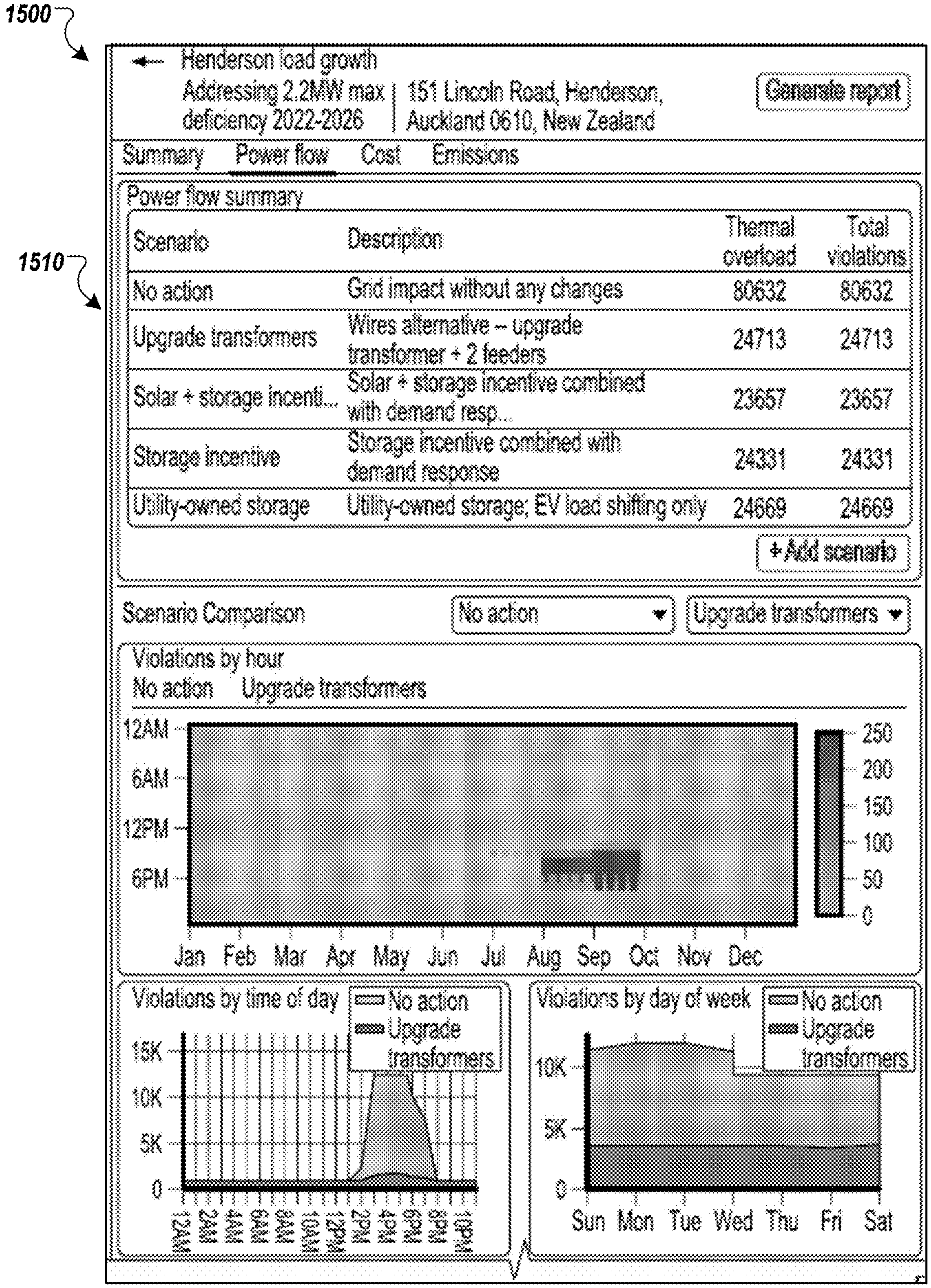
FIGS. 15A and 15B illustrate an example output user interface showing comparisons of violations for options for addressing a future power deficiency.
Figure 15B:
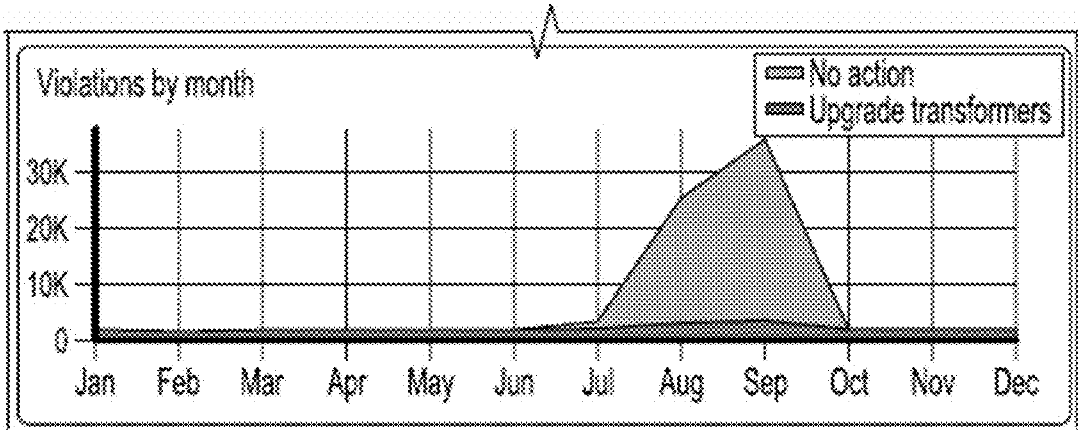

FIGS. 15A and 15B illustrate an example output user interface 1500 showing comparisons of violations for options for addressing a future power deficiency. The user interface 1500 includes a list of scenarios 1510 proposed for addressing the future power deficiency. The user interface 1500 also includes various graphs showing comparisons between the results of the different scenarios.

Figure 16:
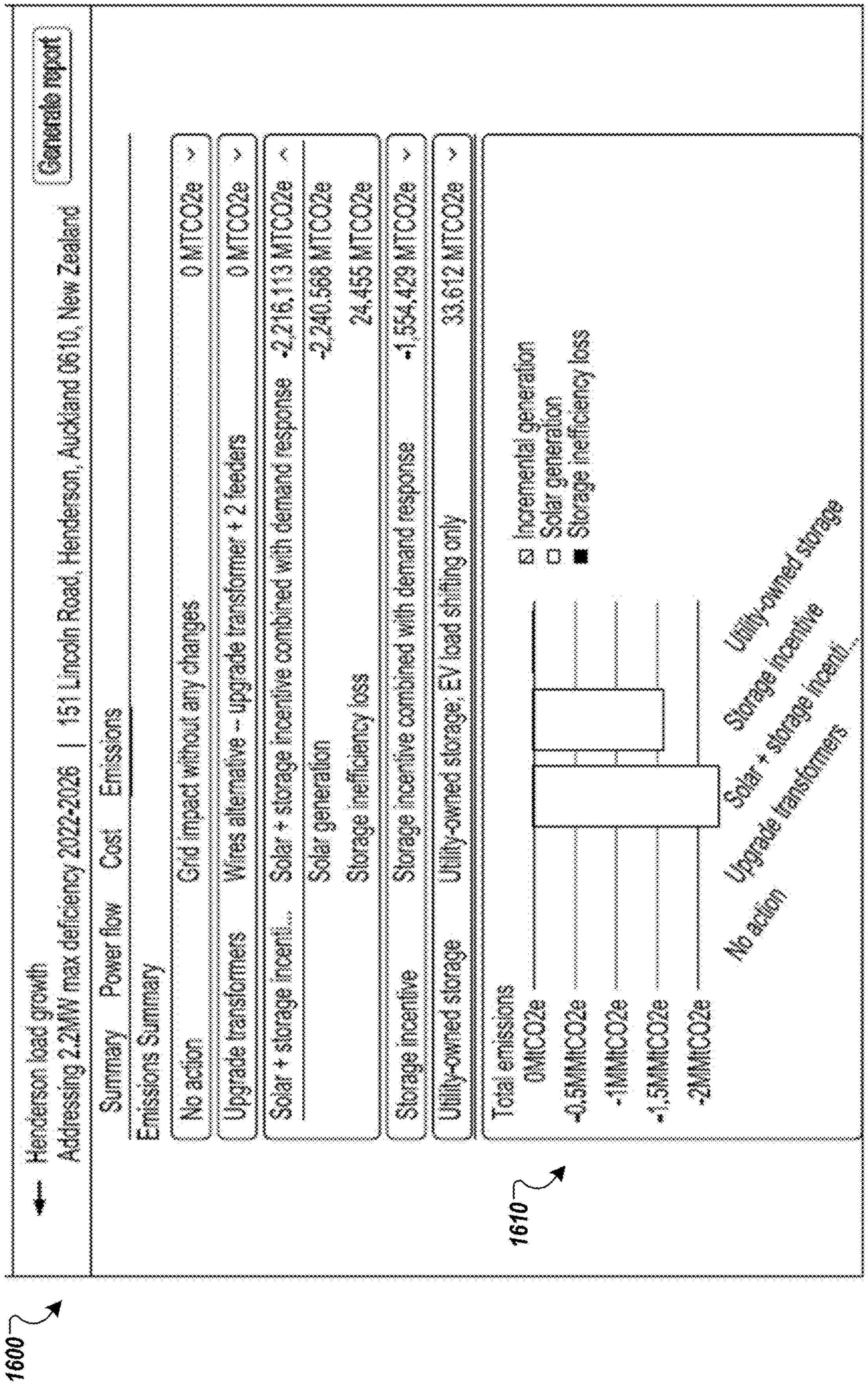
FIG. 16 illustrates an example output user interface showing a comparison of emissions for options for addressing a future power deficiency.

FIG. 16 illustrates an example output user interface 1600 showing a comparison of emissions for options for addressing a future power deficiency. The user interface 1600 includes a graph 1610 showing expected emissions impacts of the various proposed scenarios.

Figure 17:
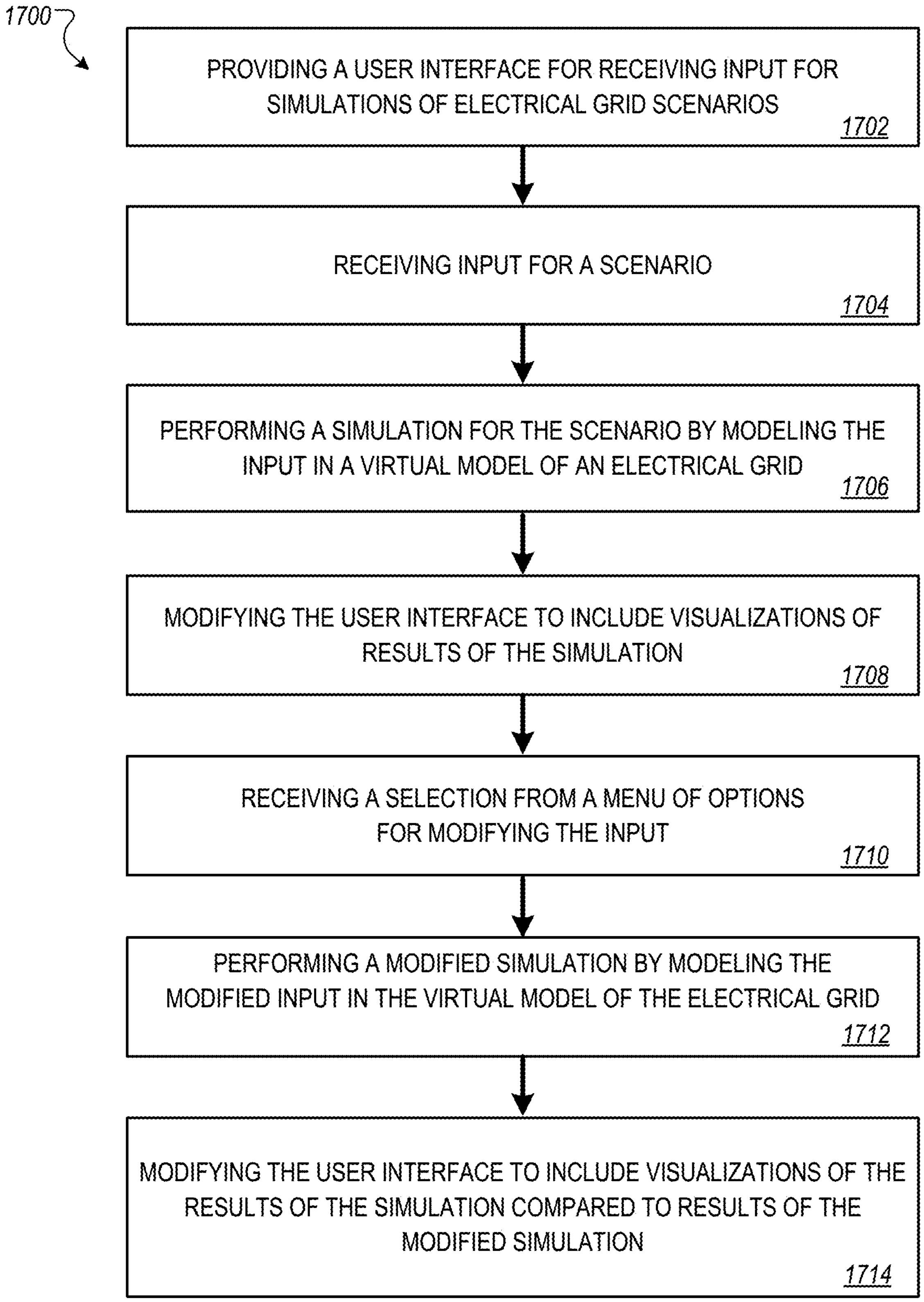
FIG. 17 illustrates an example process for simulation of modifications to an electrical grid including modifying previously modeled scenarios.

FIG. 17 illustrates an example process 1700 for simulation of modifications to an electrical grid including modifying previously modeled scenarios. The process 1700 can be performed by a computing system such as a simulation system, e.g., power grid simulation server 110.

The process 1700 includes providing, for presentation by a display, a user interface for receiving input for simulations of electrical grid scenarios (1702). The user interface can be, for example, input user interface 900.

The process 1700 includes receiving, through the user interface, input for a scenario (1704). The scenario can be, for example, a project 240 including a scenario for addressing a predicted power deficiency.

The process 1700 includes performing a simulation for the scenario by modeling the input in a virtual model of an electrical grid (1706). The virtual model of the electrical grid can be, for example, the virtual electrical grid model 115.

The process 1700 includes modifying the user interface to include visualizations of results of the simulation (1708). The user interface can be modified, for example, to include visualizations as shown in output user interface 1300 showing values for reliability, cost, and emissions for an input scenario. In some implementations, the process 1700 includes providing a second user interface including the visualizations of the results.

The process 1700 includes receiving, through the user interface, a selection from a menu of options for modifying the input (1710). The menu of options can be, for example, the menu 1310 including filters.

The process 1700 includes performing a modified simulation by modeling the modified input in the virtual model of the electrical grid (1712). The modified simulation can include the simulation performed with the application of the filter selected from the menu 1310.

The process 1700 includes modifying the user interface to include visualizations of the results of the simulation compared to the results of the modified simulation (1714). The user interface can be modified, for example, to include visualizations as shown in updated output user interface 1300 showing updated compared values for reliability, cost, and emissions for various scenarios.

Figure 18:
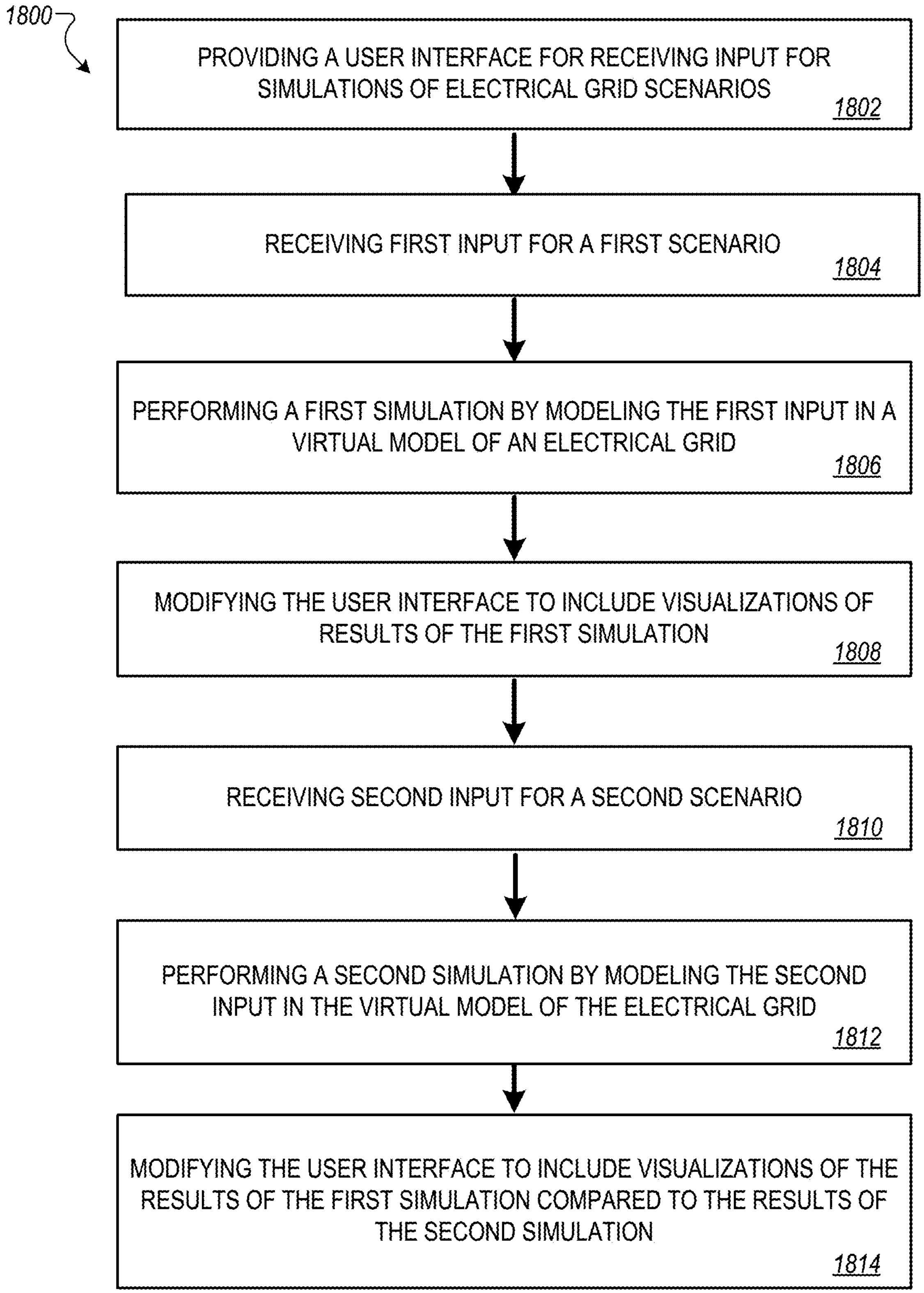
FIG. 18 illustrates an example process for simulation of modifications to an electrical grid including simulating multiple different scenarios.

FIG. 18 illustrates an example process 1800 for simulation of modifications to an electrical grid including simulating multiple different scenarios. The process 1800 can be performed by a computing system such as a simulation system, e.g., power grid simulation server 110.

The process 1800 includes providing, for presentation by a display, a user interface for receiving input for simulations of electrical grid scenarios (1802). The user interface can be, for example, input user interface 800.

The process 1800 includes receiving, through the user interface, first input for a first scenario (1804). The first input can include, for example, an annual load growth percentage 830 for a selected feeder 820.

The process 1800 includes in response to receiving the first input, performing a first simulation for the first scenario by modeling the first input in a virtual model of an electrical grid (1806). Performing the simulation for the first scenario can include simulating operations of the selected feeder 820 using the input annual load growth percentage 830.

The process 1800 includes modifying the user interface to include visualizations of results of the first simulation (1808). The user interface can be modified, for example, to include visualizations as shown in output user interface 1000.

The process 1800 includes receiving, through the user interface, second input for a second scenario (1810). The second input for the second scenario can include, for example, a modified input annual load growth percentage 830 for the selected feeder 820.

The process 1800 includes in response to receiving the second input, performing a second simulation for the second scenario by modeling the second input in the virtual model of the electrical grid (1812). Performing the simulation for the second scenario can include simulating operations of the selected feeder 820 using the modified input annual load growth percentage 830.

The process 1800 includes modifying the user interface to include visualizations of the results of the first simulation compared to the results of the second simulation (1814). The user interface can be modified, for example, to include visualizations as shown inupdated user interface 1000 showing simulation results for the first scenario and the second scenario in a comparison view.

Figure 19:
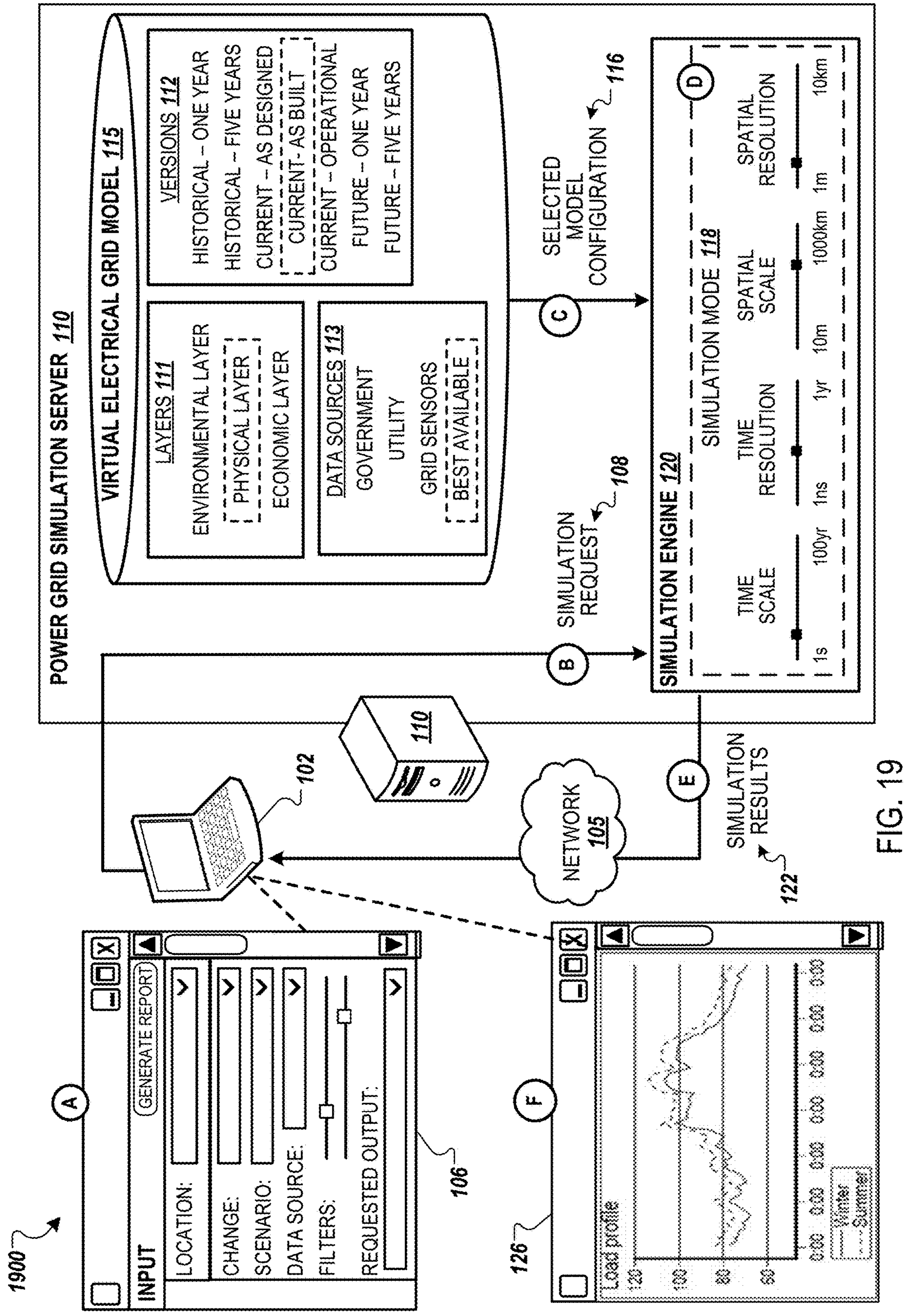
FIG. 19 is an illustration of an example server system for simulation of modifications to an electrical grid.

FIG. 19 is a diagram showing an example server system 1900 for simulation of modifications to an electrical grid. The system 1900 shows the example system 100 in greater detail.

The system 1900 includes a power grid simulation server 110 and a user device 102. The server 110 includes an electrical grid model 115 and a simulation engine 120. The user device 102 may communicate with the server 110 over, for example, a network 105.

In some examples, the electrical grid model 115, the simulation engine 120, or both, can be separate from the server 110 and may communicate with the server 110 over the network 105. The network 105 can include public and/or private networks and can include the Internet.

The user device 102 can be an electronic device such as a computing device. The user device 102 can be, for example, a desktop computer, a laptop computer, a smart phone, a cell phone, a tablet, a PDA, etc.

The server 110 is a server system and can include one or more computing devices. In some implementations, the server 110 may be part of a cloud computing platform. The server 110 may be maintained and operated, for example, by an electrical grid operator such as an electrical power utility or a third party.

In general, a user can provide a simulation request 108 to a simulation server 110 through an input user interface 106 provided through the user device 102. The simulation server 110 can conduct simulations to generate simulation results 122. The simulation server 110 can provide the simulation results 122 to the user device 102. The user device 102 can present the simulation results 122 through an output user interface 126.

FIG. 19 illustrates operations performed by the system 1900, shown as stages (A) to (F), with each representing a step in an example process for simulation of modifications to an electrical grid. Stages (A) to (F) may occur in the illustrated sequence, or in a sequence that is different from the illustrated sequence. For example, some of the stages may occur concurrently.

The system 1900 can perform simulations of electrical grid operations. The system 1900 can receive a request for an output of an electrical grid simulation. For example, in stage (A) of FIG. 19, the system 1900 displays an input user interface 106 to the user device 102. The input user interface 106 can include an input form to enable a user to input a simulation request 108.

The input user interface 106 includes input fields for various data. For example, the input user interface 106 includes an input field for a location, a change, a scenario, a data source, and requested output. In some examples, the user interface 106 can include more or fewer input fields. The user interface 106 can include input fields in various formats. For example, the user interface 106 can include input fields with drop-down menus, slider icons, text input fields, maps, selectable icons, search fields, etc.

In some examples, the input location can include a center location for the simulation, e.g., a street address or latitude and longitude. The location can also include a radius for the simulation, e.g., in kilometers. In some examples, the location can include a zip code, town, city, or county. In some examples, the location can be input by the user through an interface that displays a map. For example, the user can select regions of a map for the simulation. In some examples, the user can draw boundaries for the simulation on a map.

In an example scenario, the system may receive a request for simulation results showing real-world electrical impacts of a rapid transient event on loads of an electrical feeder if a new solar panel system is connected to the grid. In this example, the input location can be a geographic radius centered at the location of the location of the added solar panel system. The input change can be the addition of the solar panel system. The input scenario can be the rapid transient event. The data source can be the best available aggregated data. The requested output can be a number of faults caused by the rapid transient event.

In another example scenario, the system may receive a request for simulation results showing recommended actions to address a 2MW power deficiency on an electrical grid feeder. In this example, the input location can be the location of the electrical grid feeder. The input change can be an increase in power output of 2MW. The input scenario can be normal operation over the course of a year. The data source can be data provided by the electrical utility. The requested output can be a cost and reliability estimate for the recommended actions.

The input user interface can also include filters. For example, the user can apply filters to filter the simulation results. In the above example scenario, the user interface 106 can include filters for reliability and cost. The user can manipulate the icons of the user interface 106 to set a reliability filter to only show recommended actions with greater than ninety percent reliability. The user can also manipulate the input user interface 106 to set a cost filter to only show recommended actions with a cost less than $2.5M.

In stage (B) of FIG. 19, the user device 102 sends the simulation request 108 to the power grid simulation server 110, e.g., over the network 105. The simulation request 108 includes the parameters input by the user, e.g., the location, scenario, change, data source, filters, and requested output. The simulation engine 120 receives the simulation request 108.

In response to receiving the simulation request 108, the simulation engine 120 accesses the virtual electrical grid model 115. In some examples, the electrical grid model 115 is stored in a database that is stored by or is accessible to the server 110. The electrical grid model 115 can be a model of a real-world electrical power grid that transmits electrical power to loads such as residential and commercial buildings.

In some examples, the electrical grid model 115 can include a high resolution electrical model of one or more electrical distribution feeders. The electrical grid model 115 can include, for example, data models of substation transformers, distribution switches and reclosers, voltage regulation schemes, e.g., tapped magnetics or switched capacitors, network transformers, load transformers, inverters, generators, and various loads. The electrical grid model 115 can include line models, e.g., electrical models of medium voltage distribution lines. The electrical grid model 115 can also include electrical models of fixed and switched line capacitors, as well as other grid components and equipment.

The electrical grid model 115 can include a topological representation of a power grid or a portion of the power grid. The detail of the electrical grid model 115 is sufficient to allow for accurate simulation and representation of steady-state, dynamic and transient operation of the grid. The electrical grid model 115 can include various layers 111 and versions 112. The electrical grid model 115 can also include data from multiple data sources 113. In some examples, the data sources 113 can include a "best available" data source, including aggregated data from multiple data sources.

The layers 111 can include, for example, an environmental layer, a physical layer, and an economic layer. The environmental layer can include data related to the environmental impact of the electrical power grid. For example, the environmental layer can include data related to emissions of power sources powering the electrical power grid. The physical layer can include data related to physical components and operations of the electrical power grid. For example, the physical layer can include data related to equipment performance and specifications. The economic layer can include data related to the cost of the electrical power grid. For example, the economic layer can include data related to the cost of operations and maintenance of the electrical power grid.

The electrical grid model 115 includes different versions of the same electrical grid. Each version may represent the past, the present and the future states of the grid, including changes of topology over time such as introduction of new assets and changing of switch positions. This enables analyzing past behavior as well as series of planned or hypothetical scenarios. Different versions of the electrical grid model 115 can represent the intended grid design, the as-built design, the operational design, and future versions that represent combinations of planned and hypothetical equipment modifications, additions, removals, and replacements.

The versions 112 can include time-varying versions of the electrical grid model. For example, the versions 112 can include historical, current, and future versions of the electrical grid model. The historical versions can include versions of the model that represent the electrical power grid in the past, e.g., one year in the past, five years in the past, or ten years in the past. In some examples, the historical versions can be used to evaluate past performance of the electrical power grid. In some examples, the historical versions can be used for trend analysis and comparison. For example, a same simulation can be run using a historical version and a current version in order to identify any trends in electrical power grid performance over time.

The current versions of the electrical grid model 115 can include an as-designed model of the electrical power grid. The as-designed model of the electrical power grid can include models of power grid assets including their as-designed specifications and ratings. The current versions of the electrical grid model 115 can also include an as-built electrical grid model. The as-built model of the electrical power grid can include models of power grid assets including their real-world ratings. The as-built model can consider real-world effects of aging, degradation, maintenance, etc. The current versions of the electrical grid model 115 can also include a current operational version. The current operational version can include real-time or near real-time data of current operations of the electrical power grid. The current operational version can account for changes in configurations such as changes in switch positions. The current operational version can also account for current failures and outages.

The future versions of the electrical grid model 115 can include versions of the model that represent planned future configurations of the electrical power grid, e.g., one year in the future, five years in the future, or ten years in the future. The future versions of the electrical grid model 115 can include models of planned changes to the power grid, e.g., planned grid modifications that have not yet been built. In this way, cumulative impacts of multiple planned modifications can be modeled.

In some examples, the future versions of the electrical grid model 115 can include models of changes that have previously been simulated. For example, a user can input a request for simulation based on a version of the electrical grid model 115 that includes a first proposed change. The simulation server 110 can then save the version of the electrical grid model 115 that includes the first proposed change. A user can then input a request for simulation based on a version of the electrical grid model that includes a second proposed change in addition to the first proposed change. In this way, cumulative impacts of multiple proposed modifications can be modeled. In some examples, a first proposed change may be requested by a first user, and a second proposed change may be requested by a second user. The simulation server 110 can perform simulations incorporating the proposed changes requested by both the first user and by the second user. In this way, the simulation server 110 can enable collaboration between users by simulating cumulative impacts of multiple proposed changes that may be input by multiple different users.

The future versions of the electrical grid model 115 can account for expected component aging, degradation, failures, and upgrades. For example, based on the average life cycle of a component, the future versions of the electrical grid model 115 can model the degradation of the component until its end-of-life, and then account for planned performance of a replacement component. The future versions of the electrical power grid can also account for planned additions, for example, a power source that is expected to come online at a particular date in the future.

In some examples, the future versions of the electrical grid model 115 can vary according to dates along a timeline. For example, a user may be able to specify a future date, e.g., of May 6, 2028, for running a simulation. The simulation can then be performed on a future version of the electrical power grid that corresponds to the date of May 6, 2028, including any expected modifications, additions, deletions, replacements, and degradation as of that date.

In some examples, the future versions of the electrical grid model 115 can account for expected environmental and societal changes. For example, future versions of the electrical grid model 115 can account for changes in climate at the geographic location of the electrical grid. The future versions of the electrical grid model 115 can also account for changes in population, e.g., based on community growth models of the geographic location of the electrical grid. Predicted changes in climate and climate and population can be used to predict the future power demand from the electrical grid.

The electrical grid model 115 can adapt to differing levels of confidence, using machine learning to fill in gaps where model information is unknown or known with low confidence. For example, if provided connectivity data is insufficient, the model may augment automatically with connectivity information deduced from computer vision processing. For example, the electrical grid model 115 can include probabilistic models for the electrical properties of grid devices, power consumption, power generation, and asset failure based on estimated asset health.

The electrical grid model 115 can also incorporate probabilistic models of external events based on geographic location. For example, the electrical model 115 can incorporate models that indicate probabilities and frequencies of events such as earthquakes, floods, hurricanes, volcano eruptions, nuclear accidents, etc. The electrical grid model 115 can incorporate these probabilities into analysis of long-term electrical grid operations. For example, the electrical grid model 115 may be used to predict a frequency of a particular hospital losing power for greater than six hours. The prediction can be generated based on the electrical grid configurations, equipment capabilities, and predicted frequencies of external events.

The electrical grid model 115 can derive probabilistic information from historical and current versions of the electrical power grid. For example, to predict effects of a future modification of the electrical power grid, the electrical grid model 115 can analyze effects of previous similar modifications to the electrical power grid. The electrical grid model 115 can also incorporate and analyze historical data from electrical grids in various geographic locations. In this way, the electrical grid model 115 can use machine learning to identify trends and patterns in order to predict equipment performance in the future.

The data sources 113 can include, for example, government sources, utility sources, and grid sensors. The government sources can include data that is available from a government entity, e.g., a national energy regulatory commission or a state utility commission. The utility sources can include utility companies, e.g., Pacific Gas and Electric or Xcel Energy. The data sources 113 can also include grid sensors. For example, the grid sensors can be located at various locations of the power grid and can transmit operational data to the power grid simulation server 110. The grid sensor data can include historical grid sensor data, near real-time grid sensor data, or both.

In some examples, the data sources 113 can be aggregated to a "best available" data source. For example, data from the various data sources can be associated with a confidence value. The best available data source can include data from government sources, utility sources, and grid sensors. When a data point conflicts between two or more data sources, the best available data can be selected based on the data source having the highest confidence for the data point. In some examples, data sources can include versions of data from APIs. For example, weather data may be provided through a weather API provided by a weather service. The selected data sources can therefore include the most up-to-date version of the weather API.

In some examples, a data source 113 for a simulation can be selected by a user, e.g., through the user interface 106. In some examples, the simulation engine 120 can select one or more data sources 113 based on the data provided through the simulation request 108.

The electrical grid model 115 can be adaptive such that a change in one aspect of the electrical grid model 115 persists to all other aspects. For example, a new inverted-connected resource may be connected to the electrical power grid. The electrical grid model 115 can receive data indicating the new resource, e.g., from one or more of the data sources 113. The electrical grid model 115 can incorporate the new resource into each of the environmental, physical, and economic layers 111. The electrical grid model 115 can also incorporate the new resource into the current and future versions of the model.

The electrical grid model 115 can take into account the interdependency of energy systems beyond the electrical grid, such as the electrical elements of a natural gas storage, distribution and electrical generation system. The electrical grid model 115 can model interactions between the two systems. Backup power systems interacting with primary power systems is another example, particularly for battery and solar powered systems that may replace diesel generator systems. Detailed models of all interacting subsystems with associated simulations of all normal, abnormal and corner conditions can be performed.

The electrical grid model 115 can be calibrated by using measured electrical power grid data. The measured electrical power grid data can include historical grid operating data. The historical grid operating data can be collected during grid operation over a period of time, e.g., a number of weeks, months, or years. In some examples, the historical grid operating data can be average historical operating data. For example, historical grid operating data can include an electrical load on a substation during a particular hour of the year, averaged over multiple years. In another example, historical grid operating data can include a number of voltage violations of the electrical power grid during a particular hour of the year, possibly averaged over multiple years, or otherwise represented statistically.

In some examples, the electrical grid model 115 can include assumptions. For example, the electrical grid model 115 can include measured data for certain locations of the power grid, and might not include measured data for other locations. The electrical grid model 115 can use assumptions to interpolate grid operating data for locations in which measurements are not available. An assumption can be, for example, an assumed ratio or relationship between loads at industrial locations of the power grid compared to residential locations of the power grid.

In some examples, the electrical grid model 115 can include measured data for certain time intervals, e.g., certain hours, and might not include measured data for other time intervals. The electrical grid model 115 can use assumptions to estimate or interpolate grid operating data for time intervals in which measurements are not available. An assumption can be, for example, an assumed relationship between loads at a particular location at nighttime compared to daytime. In another example, an assumption can be an assumed relationship between loads at a particular location during an hour of the day in summertime, compared to during the same hour of the day in wintertime.

In some examples, the electrical grid model 115 can include measured data for certain characteristics, e.g., electrical load, and might not include measured data for other characteristics. The electrical grid model 115 can use assumptions to estimate grid operating data for characteristics for which measurements are not available. An assumption can be, for example, an assumed relationship between load and voltage at a particular location of the power grid.

In some examples, measured data can be used to resolve and reduce errors caused by assumptions in the electrical grid model 115. In some examples, the electrical grid model 115 can include conservative values in place of missing or incomplete data. In some examples, the electrical grid model 115 can use worst case assumptions to enable worst case analysis.

In stage (C) of FIG. 19, the simulation engine 120 selects a model configuration 116 of the virtual electrical grid model 115. The selected model configuration 116 can include, for example, one or more layers 111, versions 112, and data sources 113. The simulation engine 120 selects the model configuration 116 based on the simulation request 108. For example, a simulation request 108 may include a request for physical effects of a transient on the electrical grid in present day, modeled to the best available accuracy. Based on the request, the system may select a model configuration including a physical layer of a current as-built version of the virtual model that is based on data from the best available combination of data sources.

In some implementations, the simulation engine 120 includes a ruleset defining various combinations of user inputs for a simulation request 108 and appropriate simulation model configurations 116 for each combination of user inputs. The simulation engine 120 can select the model configuration 116 for a given simulation request 108 by matching the inputs of the simulation request 108 with one of the input combinations defined in the ruleset. The simulation engine 120 would select the model configuration 116 associated with the particular rule of the ruleset that defines a similar combination of user inputs as those provided with the given simulation request 108.

In stage (D) of FIG. 19, the simulation engine 120 selects a simulation mode 118 for the simulation. The simulation mode 118 can include a time scale, time resolution, spatial scale, and spatial resolution of the simulation.

The simulation mode 118 can include various time scales. The time scale indicates a simulated time duration of a simulation. For example, a simulation can generate data indicating predicted electrical grid operations over a time scale of ten years. Generally, a higher time scale corresponds to a larger time duration. For example, a time scale of ten years is a larger time scale than a time scale of one year.

In some examples, a time scale can include a number of milliseconds, seconds, hours, days, years, etc. In some examples, a simulation can include a transient simulation with a shorter time scale when issues are expected to arise in that time domain, while leaving simulation in the steady-state time domain with a larger time scale when transient effects are not expected.

The simulation mode 118 can include various time resolutions. The time resolution indicates a level of detail of a simulation in a time dimension. In some examples, the time resolution can be the time increments of data points of a simulation. Generally, a higher time resolution corresponds to a smaller unit of time measurement. For example, a time resolution of one second is a higher resolution than a time resolution of one minute.

In some examples, a time resolution can include nanoseconds, milliseconds, seconds, minutes, hours, days, weeks, months, etc. For example, the simulation engine 120 can select a time resolution of milliseconds to model transient events. The simulation engine 120 can select a time resolution of days to model steady-state events. In some examples, the simulation engine 120 can perform a simulation at a first time resolution for a portion of a simulation, and at a second time resolution for another portion of the simulation.

In some examples, the simulation engine 120 can select a time scale and time resolution based at least in part on an amount of data that will be generated. For example, a first simulation run over large time scale, e.g., of ten years, with a high time resolution, e.g., of seconds, would generate a larger amount of data compared to a second simulation run over a time scale of ten years with a smaller time resolution, e.g., of weeks. Therefore, the first simulation would likely require more processing time, processing power, and data storage compared to the second simulation. Thus, the simulation engine 120 can select an appropriate time scale and time resolution in order to obtain results without exceeding limits or thresholds related to the amount of generated data.

The simulation mode 118 can include various spatial scales. The spatial scale indicates a simulated spatial size or expanse of a simulation. In some examples, the spatial scale can be a size as measured in distance, e.g., kilometers. In some examples, the spatial scale can be a size as measured in area, e.g., square kilometers. For example, a simulation can generate data indicating predicted electrical grid operations over a spatial scale of ten square kilometers. Generally, a higher spatial scale corresponds to a larger spatial distance or area. For example, a spatial scale of ten square kilometers is a larger spatial scale than a time scale of square kilometer.

In some examples, a spatial scale can include meters, kilometers, tens of kilometers, hundreds of kilometers, thousands of kilometers, etc. For example, the simulation engine 120 can simulate large systems, on the scale of full interconnections, by taking advantage of distributed computing. The spatial scale can correspond to a geographic area of an electrical feeder, or of multiple connected electrical feeders. In some examples, the simulation engine 120 can simulate transient events with a simulation mode that includes a spatial scale on a local level. For example, the spatial scale can correspond to the size of a neighborhood, town, city, etc. In some examples, the simulation engine 120 can simulate large modifications with a simulation mode that includes a spatial scale at a regional level. For example, the spatial scale can correspond to the size of a county, state, province, etc.

The simulation mode 118 can include various spatial resolutions. The spatial resolution indicates a level of detail of a simulation in physical dimensions. In some examples, the spatial resolution can be the linear spacing of data points of a simulation. In some examples, the spatial resolution can be a size of an area represented by a single reference point. Generally, a higher spatial resolution corresponds to a smaller unit of spatial measurement. For example, a spatial resolution of one meter is a higher resolution than a spatial resolution of one kilometer.

In some examples, a spatial resolution can include centimeters, meters, tens of meters, kilometers, etc. The simulation engine 120 can perform simulations that span a range of granularity in terms of model detail. The electrical grid model 115 includes models of generation resources at various levels, including bulk power and distributed resources, conventional power plants and intermittent renewables, as well as energy storage systems. The simulation mode 118 can include a spatial resolution corresponding to subcomponent-granularity when analyzing hyperlocal impacts. The simulation mode 118 can include a spatial resolution corresponding to higher-level model granularity when analyzing broader system-level impacts. In some examples, the simulation mode 118 can include a higher spatial resolution at certain locations of the grid, and a lower spatial resolution at other locations of the grid. For example, the simulation engine 120 can select a higher spatial resolution, e.g., of centimeters, for modeling a portion of the grid, e.g., a portion of the grid that occupies a square tenth of a kilometer. The simulation engine can select a lower spatial resolution, e.g., of tens of meters, for modeling another portion of the grid, e.g., a portion of the grid that occupies ten square kilometers.

In some examples, the simulation engine 120 can select a spatial scale and spatial resolution based at least in part on an amount of data that will be generated. For example, a first simulation run over large spatial scale, e.g., of one hundred kilometers, with a high spatial resolution, e.g., of centimeters, would generate a larger amount of data compared to a second simulation run over a spatial scale of one hundred kilometers with a smaller spatial resolution, e.g., of ten meters. Therefore, the first simulation would likely require more processing time, processing power, and data storage compared to the second simulation. Thus, the simulation engine 120 can select an appropriate spatial scale and spatial resolution in order to obtain results without exceeding limits or thresholds related to the amount of generated data.

The simulation engine 120 is adaptive and can take full advantage of the details provided by the electrical grid model 115. The simulation engine 120 can be capable of switching between different simulation modes 118 based on the scales and resolutions that are appropriate for the events being simulated. For example, the simulation engine 120 can simulate steady state power flow before and after a capacitor switching event, and model the capacitor switching event itself in the time domain to analyze the electromagnetic transients.

The simulation engine 120 can switch between models of subnetworks with different levels of detail depending on the subnetwork's electrical distance to the events being simulated. For example, the simulation engine 120 can simulate a distribution feeder connected to the transmission system as a single load, but then switch to a full feeder model when simulating a fault near its substation.

The simulation engine 120 can simulate the behavior of active, controllable devices on the grid including bulk power generation, transmission and distribution system controls, and distributed energy resources such as photovoltaic and battery systems.

The simulation engine 120 can simulate a distribution of voltage and current values by treating the simulation as a stochastic process. Each simulation step can sample from provided distributions of electrical properties, load, and generation. Running many of these simulations enables estimating a distribution over the outcomes and defining confidence intervals around the predicted behavior.

The simulation engine 120 can perform simulations based on the concept of Electro-Magnetic Transients but applied to various details and various aspects of the combined electrical, mechanical, thermal, hydrocarbon-fuel subsystem. In an example, the simulation engine 120 can simulate a low-inertia, highly intermittent grid with a high proportion of electronic interfaces such as inverters between both sources and loads.

The simulated power grid data can be based on simulating operation of the power grid during a simulated time period. The simulated power grid data can include a number of different temporal and spatially dependent characteristics of the power grid. The simulated time period can be, for example, a simulated month, week, or year. In some examples, the simulated time period can be a time period between an input start time and stop time. For example, the time period can have a start time of Apr. 30, 2025 at 12:00 pm EST, and a stop time of May 22, 2025 at 11:00 am EST.

In some examples, the simulation engine 120 can generate simulated power grid data, or simulation results, for each hour of the simulated time period, e.g., a simulated year. The simulation can include predicted loads and transients over the course of the simulated year based on historical data. For example, predicted loads may vary based on predicted seasonal effects (e.g., weather conditions) and calendar effects (e.g., weekends, holidays).

The location in the power grid can include a geographic location identified by the simulation request. For example, the location can include a postal address or a latitude and longitude coordinate position.

The simulation engine 120 can then perform a series of simulations. The simulations can be based on, for example, root-mean-square (RMS), power flow, positive sequence, and/or time series voltage transient analysis. The amount of data processed during each simulation can depend on the size and framework of the distribution feeder that is being evaluated. The simulation can analyze predicted effects for all connections to the affected distribution feeder and all components of the affected distribution feeder. Thus, the complexity of simulations can vary depending on construction of the distribution feeder.

For example, the simulations can vary depending on length, power, and number of loads of a distribution feeder. A typical distribution feeder can range in length from approximately one mile to ten miles. A typical distribution feeder can range in power from approximately one to ten megawatts. The number of loads connected to a feeder can range from a few hundred residential loads to several thousand residential loads. In some cases, there may also be as few as a few dozen commercial or industrial loads, and as many as hundreds of commercial or industrial loads.

The construction of a distribution feeder can also vary based on location. In urban environments, residential loads typically share transformers. In rural environments, each residential load may have a separate transformer. Commercial and industrial loads are typically served by three-phase transformers. Thus, the number of loads and transformers in a feeder could be as low as a few hundred loads with a few hundred transformers for a rural feeder. The number of loads and transformers in a feeder could be as many as thousands of loads with hundreds of single phase transformers in an urban environment, coupled with dozens or hundreds of larger three phase loads and transformers.

In some examples, the simulation engine 120 can simulate operation of multiple feeders. For example, simulations can include analyses of operation of all feeders across a geographic region, e.g., a city, county, province, or state. In some cases, the simulation engine 120 can model operation of each individual feeder within the region, and can aggregate the results in order to model operation of the multiple feeders of the region.

In some cases, the simulation engine 120 can model operational impacts of multiple feeders on each other. For example, multiple feeders may connect to a shared substation transformer. The simulation engine 120 can simulate the impacts of transients of one feeder on another feeder that is connected to the same transformer. In some cases, the simulation engine 120 can model redirection of energy to certain loads. For example, regulatory or other requirements may require prioritization of power to load such as hospitals. The prioritization may be performed manually by an operator, or may be performed by automatic redirection. The simulation engine 120 can perform the simulation while accounting for redirection of power to high priority loads.

The simulation engine 120 can analyze the expected operation of the power grid by applying empirical historical data to the grid model. The empirical historical data can include historical electrical grid characteristics based on, for example, measurements, calculations, estimates, and interpolations. The characteristics can include, for example, load, voltage, current, and power factor. The empirical historical data can represent power grid operation of multiple interconnected components within a designated geographical area. The empirical historical data can represent average electrical grid operating characteristics over a period of time, e.g., multiple weeks, months, or years.

In some examples, the simulations can cover a range of operating conditions, particularly under extremes of voltage from the Bulk Power System (BPS) and extremes in load on the electrical distribution feeder. The simulation engine 120 can simulate corner cases of the system with the proposed interconnection added to the existing system. The simulations can also cover electrical grid conditions during steady-state operation and during transient operation. The simulation engine 120 can accurately simulate operations of loads and sources, aggregated loads and sources, and disaggregated loads and sources.

Based on the series of simulations, the simulation engine 120 outputs simulation results 122. The simulation results can include time-varying electrical power grid characteristics at different locations of the electrical power grid for the simulated time period.

In stage (E) of FIG. 19, the simulation server 110 outputs the simulation results 122 to the user device 102. The user device 102 can display the simulation results 122 for viewing by a user, e.g., through an output user interface 126.

In stage (F) of FIG. 19, the user device 102 displays the simulation results 122 to a user through the output user interface 126. The output user interface 126 can display, for example, graphs, charts, and tables that indicate results of the simulation. In some examples, the output user interface 126 can display a visualization of the simulation results 122 in a two-dimensional and/or three-dimensional map view. The output user interface 126 can also display data including expected effects of proposed changes to the electrical grid. Expected effects can include costs, environmental effects such as changes in emissions, and changes in reliability of the electrical grid. The output user interface 126 can be interactive in order to enable a user to examine the results. For example, a user can select, e.g., using a computer mouse, an individual test, time period, or location, in order to view respective detailed simulation results.

This disclosure generally describes computer-implemented methods, software, and systems for electrical power grid visualization. A computing system can receive various electrical power grid data from multiple sources. Power grid data can include different temporal and spatially dependent characteristics of a power grid. The characteristics can include, for example, power flow, voltage, power factor, feeder utilization, and transformer utilization. These characteristics can be coupled; for example, some characteristics may influence others and/or their temporal and spatial dependence may be related.

Data sources can include satellites, aerial image databases, publicly available government power grid databases, and utility provider databases. The sources can also include sensors installed within the electrical grid by the grid operator or by others, e.g., power meters, current meters, voltage meters, or other devices with sensing capabilities that are connected to the power grid. Data sources can include databases and sensors for both high voltage transmission and medium voltage distribution and low voltage utilization systems.

The data can include, but is not limited to, map data, transformer locations and capacities, feeder locations and capacities, load locations, or a combination thereof. The data can also include measured data from various points of the electrical grid, e.g., voltage, power, current, power factor, phase, and phase balance between lines. In some examples, the data can include historical measured power grid data. In some examples, the data can include real-time measured power grid data. In some examples, the data can include simulated data. In some examples, the data can include a combination of measured and simulated data.

Implementations of the subject matter and the functional operations described in this specification can be implemented in digital electronic circuitry, in tangibly-implemented computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including, by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any system or on the scope of what may be claimed, but rather as descriptions of features that may be specific to particular implementations of particular systems. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of sub-combinations.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be helpful. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art.

For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method comprising:

providing, for presentation by a display, a user interface including graphics depicting one or more fields for receiving input for simulations of electrical grid scenarios;

receiving, through the user interface, input for a scenario, the input including:

a geographic location for the scenario;

a time scale for the scenario; and a proposed modification to a real-world electrical grid;

performing a baseline simulation for a baseline scenario for the geographic location and the time scale included in the input, wherein the baseline simulation for the baseline scenario is performed using a version of a virtual model of the electrical grid that represents a current configuration of a real-world electrical grid as determined using operational data generated by grid sensors configured to measure parameters of the real-world electrical grid;

performing a simulation for the scenario using a version of the virtual model of the electrical grid that is adjusted based on the proposed modification;

modifying the user interface to include graphics depicting:

one or more visualizations of results of the simulation of the scenario compared to results of the baseline simulation of the baseline scenario; and a menu of options for modifying the input;

receiving, through the user interface, a selection from the menu of options for modifying the input;

performing a modified simulation using the modified input; and modifying the user interface to include graphics depicting one or more visualizations of results of the modified simulation compared to (i) the results of the simulation, (ii) the results of the baseline simulation, or (iii) both.

2. The method of claim 1, wherein the display comprises a first display, the method comprising:

receiving, through a second user interface presented on a second display, input for a second scenario, the input including a second proposed modification to the electrical grid;

performing a second simulation using a version of the virtual model of the electrical grid that represents the electrical grid with the second proposed modification; and modifying the user interface to include graphics depicting one or more visualizations of the results of the simulation compared to the results of the second simulation.

3. The method of claim 1, wherein:

the proposed modification included in the scenario comprises a particular grid configuration, and performing the simulation for the scenario comprises:

adjusting the virtual model of the electrical grid to represent the particular grid configuration; and determining characteristics of the adjusted virtual model of the electrical grid under various simulated conditions.

4. The method of claim 3, wherein the particular grid configuration includes at least one of an added or removed power source, an upgraded asset, or an added or removed connection.

5. The method of claim 3, wherein the various simulated conditions include at least one of various environmental conditions or various load conditions.

6. The method of claim 1, wherein:

the proposed modification included in the scenario comprises a particular condition, and performing the simulation for the scenario comprises:

adjusting the virtual model of the electrical grid to represent the particular condition; and determining characteristics of the adjusted virtual model of the electrical grid in various simulated grid configurations.

7. The method of claim 6, wherein the particular condition includes at least one of a particular environmental condition or a particular load condition.

8. The method of claim 6, wherein the various simulated grid configurations include at least one of added and removed power sources, upgraded assets, or added or removed connections.

9. The method of claim 1, wherein:

the modified input includes a second proposed modification to the electrical grid that is different from the proposed modification, and the results of the modified simulation include effects of the second proposed modification on results of the baseline simulation.

10. The method of claim 1, comprising:

evaluating the input for the scenario using a set of rules;

determining whether the input for the scenario violates any rules of the set of rules; and in response to determining that the input for the scenario does not violate any rules of the set of rules, performing the simulation for the scenario; or in response to determining that the input for the scenario violates at least one rule of the set of rules:

providing, for presentation by the display, a notification that the proposed modification violates at least one rule of the set of rules and a menu of selectable options for waiving the at least one rule or editing the input.

11. The method of claim 10, wherein each rule included in the set of rules comprises at least one of a law, a regulation, an equipment limitation, an operational limitation, or an industrial standard.

12. The method of claim 1, wherein the geographic location includes a location of a selected feeder of the real-world electrical grid.

13. The method of claim 1, wherein the input for the scenario includes only the geographic location for the scenario, the time scale for the scenario, and the proposed modification to the real-world electrical grid, the method comprising:

in response to receiving the input for the scenario, accessing the virtual model of the electrical grid, the virtual model including multiple different model configurations; and selecting, automatically and based on the input for the scenario, (i) a simulation mode including a resolution and scale of the simulation and (ii) one of the multiple different model configurations, wherein performing the simulation for the scenario comprises executing the simulation in the selected simulation mode using the selected model configuration.

14. The method of claim 1, wherein the proposed modification comprises a specified change in a level of electric vehicle usage or solar panel usage within the geographic location over the time scale for the scenario.

15. The method of claim 1, wherein:

the proposed modification comprises an addition of a power source to the electrical grid, the input for the scenario including:

a type of the power source;

a rating of the power source; and a location at which the power source is to be connected to the electrical grid; and the modified input comprises at least one of:

a modified type of the power source;

a modified rating of the power source; or a modified location at which the power source is to be connected to the electrical power grid.

16. The method of claim 1, wherein:

the proposed modification comprises a rate of change of load within the geographic location over the time scale for the scenario; and the modified input comprises a modified rate of change of load within the geographic location over the time scale for the scenario.

17. A non-transitory computer storage medium encoded with instructions that, when executed by one or more computers, cause the one or more computers to perform operations comprising:

providing, for presentation by a display, a user interface including graphics depicting one or more fields for receiving input for simulations of electrical grid scenarios;

receiving, through the user interface, input for a scenario, the input including:

a geographic location for the scenario;

a time scale for the scenario; and a proposed modification to a real-world electrical grid;

performing a baseline simulation for a baseline scenario for the geographic location and the time scale included in the input, wherein the baseline simulation for the baseline scenario is performed using a version of a virtual model of the electrical grid that represents a current configuration of a real-world electrical grid as determined using operational data generated by grid sensors configured to measure parameters of the real-world electrical grid;

performing a simulation for the scenario using a version of the virtual model of the electrical grid that is adjusted based on the proposed modification;

modifying the user interface to include graphics depicting:

one or more visualizations of results of the simulation of the scenario compared to results of the baseline simulation of the baseline scenario; and a menu of options for modifying the input;

receiving, through the user interface, a selection from the menu of options for modifying the input;

performing a modified simulation using the modified input in the version of the virtual model of the electrical grid that is adjusted based on the proposed modification; and modifying the user interface to include graphics depicting one or more visualizations of results of the modified simulation compared to (i) the results of the simulation, (ii) the results of the baseline simulation, or (iii) both.

18. A computer-implemented method comprising:

providing, for presentation by a display, a user interface including graphics depicting one or more fields for receiving input for simulations of electrical grid scenarios;

receiving, through the user interface, first input for a first scenario;

performing a baseline simulation for a baseline scenario using a version of a virtual model of a real-world electrical grid as determined using operational data generated by grid sensors configured to measure parameters of the real-world electrical grid;

in response to receiving the first input, performing a first simulation for the first scenario using a first version of a virtual model of the electrical grid that is adjusted based on the first input;

modifying the user interface to include graphics depicting:

one or more visualizations of results of the first simulation for the first scenario compared to results of the baseline simulation of the baseline scenario; and a selectable option to input an additional scenario;

in response to receiving a selection of the selectable option to input an additional scenario, modifying the user interface to include graphics depicting the one or more fields for receiving input for simulations of electrical grid scenarios;

receiving, through the user interface, second input for a second scenario;

in response to receiving the second input, performing a second simulation for the second scenario using a second version of the virtual model of the electrical grid that is adjusted based on the second input; and modifying the user interface to include graphics depicting one or more visualizations of the results of the second simulation compared to (i) results of the first simulation, the results of the baseline simulation, or both.

19. The method of claim 18, wherein the display comprises a first display, the method comprising:

receiving, through a second user interface presented on a second display, third input for a third scenario;

performing a third simulation by modeling the third input for the third scenario in the virtual model of the electrical grid; and modifying the user interface to include graphics depicting one or more visualizations of the results of the first simulation compared to the results of the third simulation.

20. The method of claim 19, wherein:

the first scenario comprises a particular grid configuration, and performing the first simulation for the first scenario comprises:

adjusting the virtual model of the electrical grid to represent the particular grid configuration; and determining characteristics of the adjusted virtual model of the electrical grid under various simulated conditions.

* * * * *